(12) United States Patent
Martínez et al.

(10) Patent No.: US 11,461,097 B2
(45) Date of Patent: Oct. 4, 2022

(54) CONTENT-ADDRESSABLE PROCESSING ENGINE

(71) Applicant: Cornell University, Ithaca, NY (US)

(72) Inventors: José F. Martínez, Ithaca, NY (US);
Helena Caminal, Ithaca, NY (US);
Kailin Yang, Ithaca, NY (US); Khalid Al-Hawaj, Ithaca, NY (US);
Christopher Batten, Ithaca, NY (US)

(73) Assignee: CORNELL UNIVERSITY, Ithaca, NY (US)

(*) Notice: Subject to any disclaimer, the term of this patent is extended or adjusted under 35 U.S.C. 154(b) by 0 days.

(21) Appl. No.: 17/149,936

(22) Filed: Jan. 15, 2021

(65) Prior Publication Data
US 2022/0229663 A1      Jul. 21, 2022

(51) Int. Cl.
*G06F 9/30*      (2018.01)
(52) U.S. Cl.
CPC ........ *G06F 9/30036* (2013.01); *G06F 9/3001* (2013.01); *G06F 9/3004* (2013.01)
(58) Field of Classification Search
None
See application file for complete search history.

(56) References Cited

U.S. PATENT DOCUMENTS

| | | | | |
|---|---|---|---|---|
| 2007/0233766 A1* | 10/2007 | Gschwind | ............. | G06F 9/3887 712/E9.071 |
| 2007/0250681 A1* | 10/2007 | Horvath | ............. | G06F 9/30036 712/4 |
| 2012/0260061 A1* | 10/2012 | Reid | ............. | G06F 15/8076 712/3 |
| 2013/0185540 A1* | 7/2013 | Hung | ............. | G06F 15/8007 712/7 |

OTHER PUBLICATIONS

Aga, S. et al., "Compute Caches," 2017 IEEE International Symposium on High Performance Computer Architecture, 2017, IEEE, pp. 481-492.

(Continued)

*Primary Examiner* — Eric Coleman
(74) *Attorney, Agent, or Firm* — Withrow & Terranova, P.L.L.C.

(57) ABSTRACT

A content-addressable processing engine, also referred to herein as CAPE, is provided. Processing-in-memory (PIM) architectures attempt to overcome the von Neumann bottleneck by combining computation and storage logic into a single component. CAPE provides a general-purpose PIM microarchitecture that provides acceleration of vector operations while being programmable with standard reduced instruction set computing (RISC) instructions, such as RISC-V instructions with standard vector extensions. CAPE can be implemented as a standalone core that specializes in associative computing, and that can be integrated in a tiled multicore chip alongside other types of compute engines. Certain embodiments of CAPE achieve average speedups of 14× (up to 254×) over an area-equivalent out-of-order processor core tile with three levels of caches across a diverse set of representative applications.

17 Claims, 10 Drawing Sheets

(56) References Cited

OTHER PUBLICATIONS

Cavalcante, M. et al., "Ara: A 1-GHz+ Scalable and Energy-Efficient RISC-V Vector Processor With Multiprecision Floating-Point Support in 22-nm FD-SOI," IEEE Transactions on Very Large Scale Integration (VLSI) Systems, Dec. 2019, IEEE, 14 pages.

Dahad, N., "Andes' Core has RISC-V Vector Instruction Extension," EE Times, Dec. 9, 2019, https://www.eetimes.com/andes-core-has-risc-v-vector-instruction-extension/#, 4 pages.

Draper, J. et al., "The Architecture of the DIVA Processing-In-Memory Chip," Proceedings of the 16th International Conference on Supercomputing (ICS '02), Jun. 22-26, 2002, New York, New York, USA, ACM, 12 pages.

Eckert, C. et al., "Neural Cache: Bit-Serial In-Cache Acceleration of Deep Neural Networks," 2018 ACM/IEEE 45th Annual International Symposium on Computer Architecture, Jun. 1-6, 2018, Los Angeles, CA, USA, IEEE, 14 pages.

Elliott, D. et al., "Computational Ram: A Memory-SIMD Hybrid and its Application to DSP," IEEE Custom Integrated Circuits Conference, May 3-6, 1992, Boston, MA, IEEE, 4 pages.

Elliott, D. et al., "Computational RAM:Implementing Processors in Memory," IEEE Design & Test of Computers, vol. 16, Issue 1. Jan.-Mar. 1999, IEEE, pp. 32-41.

Fujiki, D. et al., "Duality Cache for Data Parallel Acceleration," Proceedings of the 46th International Symposium on Computer Architecture (ISCA), Jun. 22-26, 2019, Phoenix, AZ, ACM, 14 pages.

Gokhale, M. et al., "Processing in Memory: The Terasys Massively Parallel PIM Array," Computer, vol. 28, Issue 1, Apr. 1995, IEEE, 9 pages.

Guo, Q. et al., "AC-DIMM: Associative Computing with STT-MRAM," Proceedings of the 40th Annual International Symposium on Computer Architecture (ISCA), Jun. 2013, ACM, 12 pages.

Imani, M. et al., "FloatPIM: In-Memory Acceleration of Deep Neural Network Training with High Precision," The 46th Annual International Symposium on Computer Architecture (ISCA '19), Jun. 22-26, 2019, Phoenix, AZ, USA, ACM, pp. 802-815.

Jeloka, S. et al., "A 28 nm Configurable Memory(TCAM/BCAM/SRAM) Using Push-Rule 6T Bit Cell Enabling Logic-In-Memory," IEEE Journal of Solid-State Circuits, vol. 51, No. 4, Apr. 2016, 13 pages.

Kang, Y. et al., "FlexRAM: Toward an Advanced Intelligent Memory System," Proceedings of the International Conference on Computer Design, Sep. 30-Oct. 3, 2012, Montreal, QC, Canada, IEEE, 10 pages.

Kaplan, R. et al., "PRINS: Processing-in-Storage Acceleration of Machine Learning," IEEE Transactions on Nanotechnology, vol. 17, No. 5, Jan. 2018, IEEE, 8 pages.

Kogge, P., "EXECUBE—A New Architecture for Scaleable MPPs," International Conference on Parallel Processing (ICPP'94), Aug. 15-19, 1994, North Carolina State University, Raleigh, NC, USA, IEEE, 8 pages.

Lee, Y. et al., "A 45nm 1.3GHz 16.7 Double-Precision GFLOPS/W RISC-V Processor with Vector Accelerators," 40th European Solid State Circuits Conference (ESSCIRC), Sep. 22-26, 2014, Venice Lido, Italy, IEEE, 4 pages.

Li, S. et al., "DRISA: A DRAM-based Reconfigurable In-Situ Accelerator," Proceedings of MICRO-50, Oct. 14-18, 2017, Cambridge, MA, USA, ACM, 14 pages.

Mai, K. et al., "Smart Memories: A Modular Reconfigurable Architecture," Proceedings of 27th International Symposium on Computer Architecture, Jun. 2000, Vancouver, BC, Canada, IEEE, 11 pages.

Morad, A., et al., "Resistive GP-SIMD Processing-In-Memory," ACM Transactions on Architecture and Code Optimization, vol. 12, Issue 4, Article No. 57, Jan. 2016, ACM, 22 pages.

Oskin, M. et al., "Active Pages: A Computation Model for Intelligent Memory," International Symposium on Computer Architecture, Jun. 27-Jul. 1, 1998, Barcelona, Spain, IEEE, 12 pages.

Pagiamtzis, K. et al., "Content-Addressable Memory (CAM) Circuits and Architectures: A Tutorial and Survey," IEEE Journal of Solid-State Circuits, vol. 41, No. 3, Mar. 2006, IEEE, pp. 712-727.

Patterson, D. et al., "A Case for Intelligent RAM," IEEE Micro, vol. 17, Issue 2, Mar./Apr. 1997, IEEE, pp. 34-44.

Seshadri, V. et al., "Ambit: In-Memory Accelerator for Bulk Bitwise Operations Using Commodity DRAM Technology," MICRO-50, Oct. 14-18, 2017, Cambridge, MA, USA, ACM, 15 pages.

Srivastava, P. et al., "PROMISE: An End-to-End Design of a Programmable Mixed-Signal Accelerator for Machine-Learning Algorithms," 2018 ACM/IEEE 45th Annual International Symposium on Computer Architecture, Jun. 1-6, 2018, Los Angelas, CA, IEEE, pp. 43-56.

Throndson, M., "The SiFive Vector Processor," RISC-V Summit, Dec. 11, 2019, https://riscv.org//wp-content/uploads/2019/12/12.11-13.20b-SiFive-Vector-slides-v7.2final.pdf, 12 pages.

Yantir, H.E. et al., "Low-Power Resistive Associative Processor Implementation Through the Multi-Compare," 2018 25th IEEE International Conference on Electronics, Circuits and Systems (ICECS), Dec. 9-12, 2018, IEEE, 4 pages.

Yavits, L. et al., "Computer architecture with associative processor replacing last-level cache and simd accelerator," IEEE Transactions on Computers, vol. 64, Issue 2, Feb. 2015, IEEE, 14 pages.

Zha, Y. et al., "Hyper-AP: Enhancing Associative Processing Through A Full-Stack Optimization," 2020 ACM/IEEE 47th Annual International Symposium on Computer Architecture (ISCA), May 30-Jun. 3, 2020, Valencia, Spain, IEEE, 14 pages.

* cited by examiner

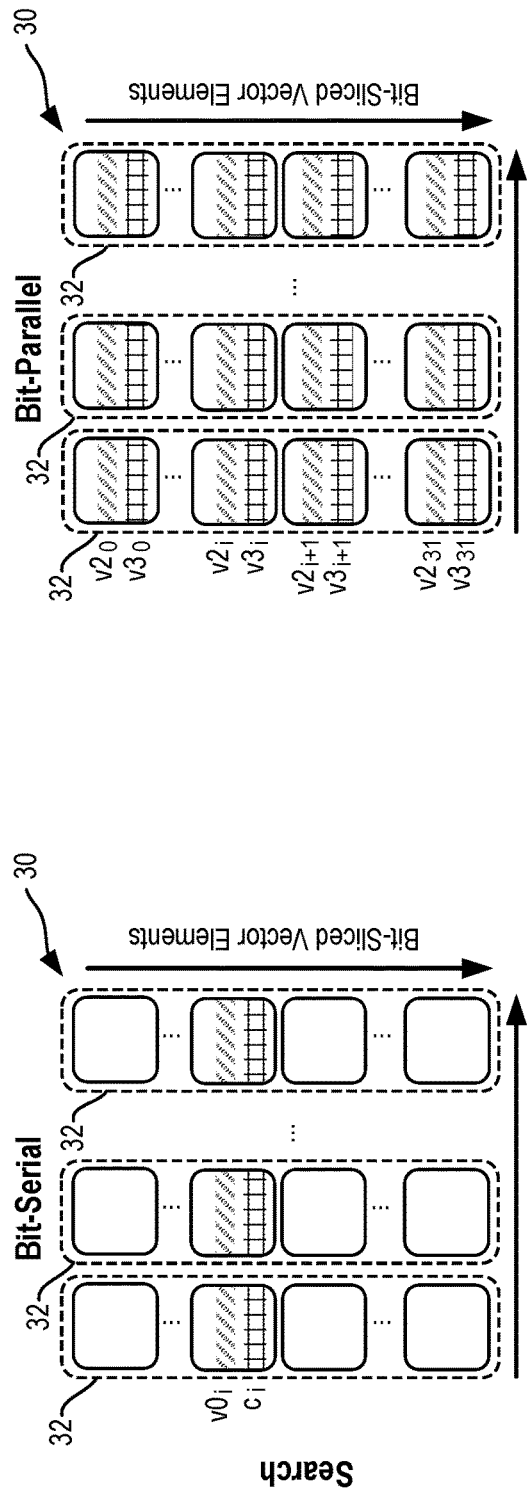
FIG. 4A
FIG. 4B
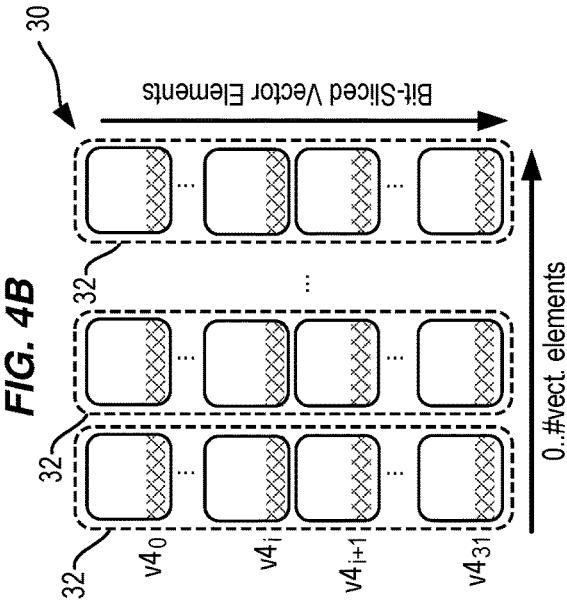
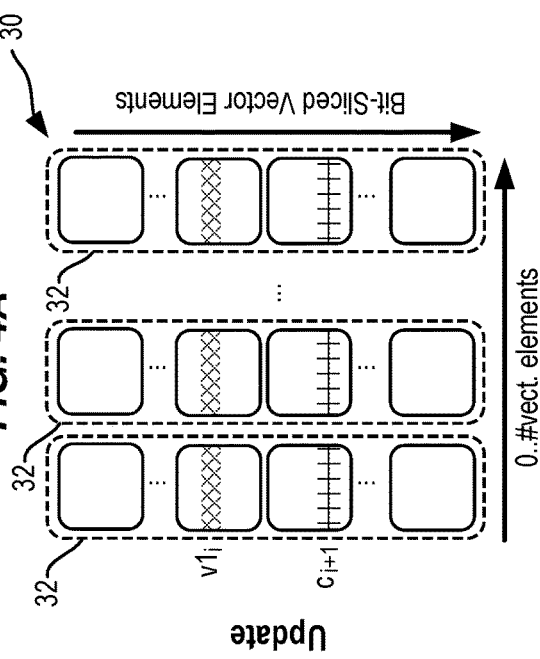
FIG. 4C
FIG. 4D

CONTENT-ADDRESSABLE PROCESSING ENGINE

GOVERNMENT SUPPORT

This invention was made with government funds under Agreement No. HR0011-18-3-0004 awarded by The Defense Advanced Research Projects Agency (DARPA). The U.S. Government has certain rights in this invention.

FIELD OF THE DISCLOSURE

The present disclosure relates to processing-in-memory (PIM) architectures for general purpose computing.

BACKGROUND

Processing-in-memory (PIM) architecture proposals attempt to overcome the von Neumann bottleneck by combining computation and storage logic into a single component. In particular, in-situ PIM architectures leverage low-level computational abilities in a memory array. Content-addressable memories (CAMs) arguably constitute the first in-situ PIM architectures, as they have been around for more than 60 years. CAMs are equipped with additional logic per bitcell to perform searches to many cells simultaneously.

Content-addressable parallel processor (CAPP) designs from the 1970s extend CAMs with the ability to search and update multiple rows in parallel. By sequencing such search/update operations, CAPP designs can also perform a variety of arithmetic and logic operations (referred to as associative algorithms) in a massively parallel and bit-serial fashion.

Recently, some interesting proposals have emerged that advocate for leveraging the foundations of CAPP in modern microarchitectures. However, the proposed solutions require emerging memory technology or expensive 12T memory bitcells. In addition, these proposals require either low-level programming or a restrictive programming language with a custom compilation flow.

SUMMARY

A content-addressable processing engine, also referred to herein as CAPE, is provided. Processing-in-memory (PIM) architectures attempt to overcome the von Neumann bottleneck by combining computation and storage logic into a single component. For example, the content-addressable parallel processing (CAPP) paradigm from the 1970s is an in-situ PIM architecture that leverages content-addressable memories to realize bit-serial arithmetic and logic operations via sequences of search and update operations over multiple memory rows in parallel. Embodiments described herein apply the concepts behind classic CAPP to build an entirely complementary metal-oxide-semiconductor (CMOS)-based, general-purpose microarchitecture that can deliver manifold speedups while remaining highly programmable.

CAPE provides a general-purpose PIM microarchitecture that provides acceleration of vector operations while being programmable with a general instruction set (e.g., standard reduced instruction set computing (RISC) instructions, such as RISC-V instructions with standard vector extensions). CAPE can be implemented as a standalone core that specializes in associative computing, and that can be integrated in a tiled multicore chip alongside other types of compute engines. Certain embodiments of CAPE achieve average speedups of 14× (up to 254×) over an area-equivalent out-of-order processor core tile with three levels of caches across a diverse set of representative applications.

An exemplary embodiment provides a CAPE configured to execute a program having scalar operations and vector operations. The CAPE includes a control processor configured to execute the scalar operations. The CAPE further includes a compute-storage block (CSB) configured to execute the vector operations in situ by an array of content-addressable parallel processing memories.

Another exemplary embodiment provides an integrated circuit. The integrated circuit includes a CAPE comprising an array of content-addressable parallel processing memories. The CAPE is configured to execute processing instructions comprising instructions for executing vector operations. The CAPE executes the vector operations in situ by the array of content-addressable parallel processing memories.

Another exemplary embodiment provides a method for executing a program using parallel processing in a CAPE. The method includes receiving, at the CAPE, a set of processing instructions described by a general instruction set. The method further includes executing scalar operations from the set of processing instructions. The method further includes executing vector operations from the set of processing instructions in situ by an array of content-addressable parallel processing memories.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4A is a block schematic diagram of bit-vector active operands for bit-serial search on an exemplary compute-storage block (CSB).

FIG. 4B is a block schematic diagram of bit-vector active operands for bit-parallel search on the CSB.

FIG. 4C is a block schematic diagram of bit-vector active operands for bit-serial update on the CSB.

FIG. 4D is a block schematic diagram of bit-vector active operands for bit-parallel update on the CSB.

DETAILED DESCRIPTION

Figure 1:
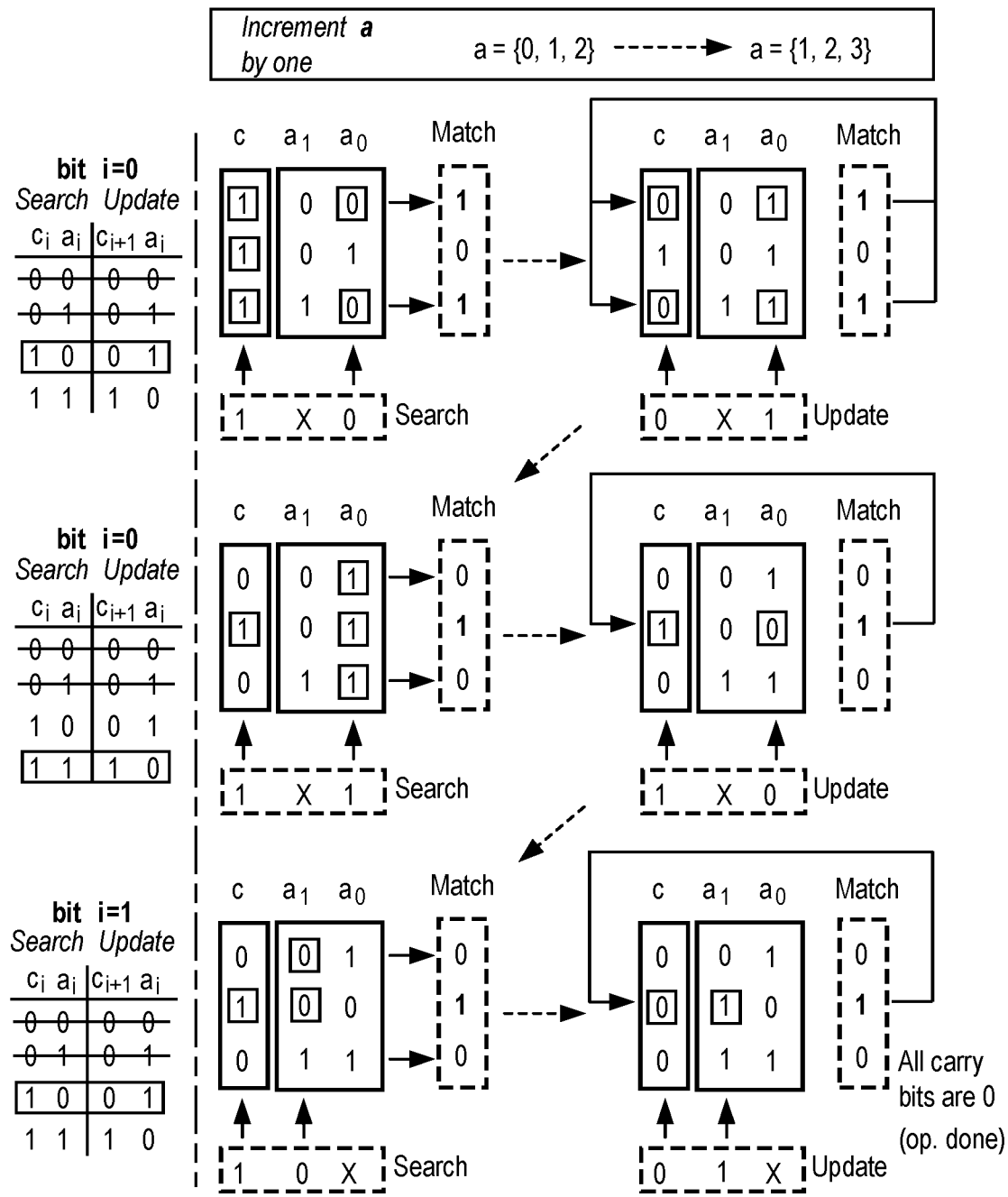
FIG. 1 is a block diagram of an example associative increment algorithm.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A content-addressable processing engine, also referred to herein as CAPE, is provided. Processing-in-memory (PIM) architectures attempt to overcome the von Neumann bottleneck by combining computation and storage logic into a single component. For example, the content-addressable parallel processing (CAPP) paradigm from the 1970s is an in-situ PIM architecture that leverages content-addressable memories to realize bit-serial arithmetic and logic operations via sequences of search and update operations over multiple memory rows in parallel. Embodiments described herein apply the concepts behind classic CAPP to build an entirely complementary metal-oxide-semiconductor (CMOS)-based, general-purpose microarchitecture that can deliver manifold speedups while remaining highly programmable.

CAPE provides a general-purpose PIM microarchitecture that provides acceleration of vector operations while being programmable with a general instruction set (e.g., standard reduced instruction set computing (RISC) instructions, such as RISC-V instructions with standard vector extensions). CAPE can be implemented as a standalone core that specializes in associative computing, and that can be integrated in a tiled multicore chip alongside other types of compute engines. Certain embodiments of CAPE achieve average speedups of 14× (up to 254×) over an area-equivalent out-of-order processor core tile with three levels of caches across a diverse set of representative applications.

I. Introduction

Embodiments described herein apply the concepts behind classic CAPP architectures to build an entirely CMOS-based, general-purpose microarchitecture that can deliver manifold speedups while remaining highly programmable. An exemplary full-stack design of CAPE, built out of dense push-rule six-transistor (6T) static random-access memory (SRAM) arrays, is described. This embodiment of CAPE is programmable using RISC-V instruction set architecture (ISA) with standard vector extensions. It should be understood that embodiments described herein are programmable with any general instruction set, i.e. an instruction set for performing many types of computer instructions rather than a parallel processing-specific instruction set (e.g., a RISC instruction set or complex instruction set computing (CISC) instruction set).

The contributions of this disclosure include:
A CMOS-based implementation of an associative-compute-capable engine based on dense 6T SRAM arrays.

An optimized data layout on these SRAM arrays that maximizes operand locality.

A microarchitecture organization that can perform data-parallel computations on tens of thousands of vector elements.

A system organization able to perform efficient data transfers to maintain the benefits of its inherent massively parallel computational power.

A mapping of the standard RISC-V ISA to this microarchitecture, which allows for generality, high programmability, and compatibility with existing compilation flows.

II. Associative Computing

An associative computing engine 1) stores data in vector form, 2) can compare a key against all vector elements in parallel (search), and 3) can update all matching elements in bulk with a new value (update). These operations are typically arranged in search-update pairs, and they are bit-serial, element-parallel—i.e., a search-update pair operates on the same bit of all the elements of a vector, the next pair on the next bit, and so forth. The sequence of search-update pairs that operate sequentially on all the bits of each vector value constitute basically an instruction in this associative computing paradigm. Associative algorithms are thus simply sequences of such instructions, much like a regular program.

FIG. 1 is a block diagram of an example associative increment algorithm. In the associative increment algorithm, all vector elements go up in value by one. An associative computing engine would first add 1 to the least significant bit of all vector elements and remember any carry. Then, for each element, it would add the corresponding carry to the next bit; and so forth. However, an associative computing engine generally does not "add" bits per se. Instead, it implements bitwise addition through a sequence of search-update pairs that essentially follow the truth tables for a half adder, one bit combination at a time: 1) Search vector elements for which the ith bit is 0 and the running carry for that element (an additional bit of storage) is 1, then bulk-update the ith bit of matching elements to 1 and their running carry to 0. 2) Search vector elements whose ith bit is 1 and the running carry for that element is also 1, then bulk-update the ith bit of matching elements to 0 and the running carry to 1.

Note that, in the example of FIG. 1, the increment algorithm does not bother with search-update pairs for the two cases where carry is 0. This is because the output in each case is the same as the input—neither the element's bit nor the running carry flip as a result of applying the half adder truth table (crossed-out entries in the truth tables of FIG. 1). Note also that some additional support beyond search/update would be needed, namely: 1) Two bits of additional storage per vector element are needed. One bit serves as the running carry (initialized to 1 at the beginning of the instruction with a single bulk-update), and one bit serves to "tag" matching elements (Match) in each of the two searches. Fortunately, these extra bits can be reused across a vector element's bits (in fact, they can be reused across instructions, even if the vector names change). 2) In order to constrain searches and updates to the ith bit of each element, embodiments may be able to mask out the other bits. 3) The sequence of operations that implements the increment instruction needs to be "stored" somewhere (e.g., the micro-memory of a sequencer).

This procedure seems painfully slow: for each bit multiple search and update operations are required. Already for a relatively simple increment instruction on a 32-bit value this would represent over one hundred such operations. However, this is done simultaneously on tens of thousands of vector elements, and therein lies the power of associative computing. As the results below will show, such vector-level parallelism more than makes up for the bit-serial nature of these operations.

III. Overview of CAPE

One goal of this disclosure is to leverage associative computing to deliver manifold speedups while remaining highly programmable and general. Accordingly, CAPE provides an implementation of associative computing as an in-situ PIM core that uses state-of-the-art CMOS technology, adopts a contemporary ISA abstraction, and can be readily integrated into a tiled architecture.

Figure 2:
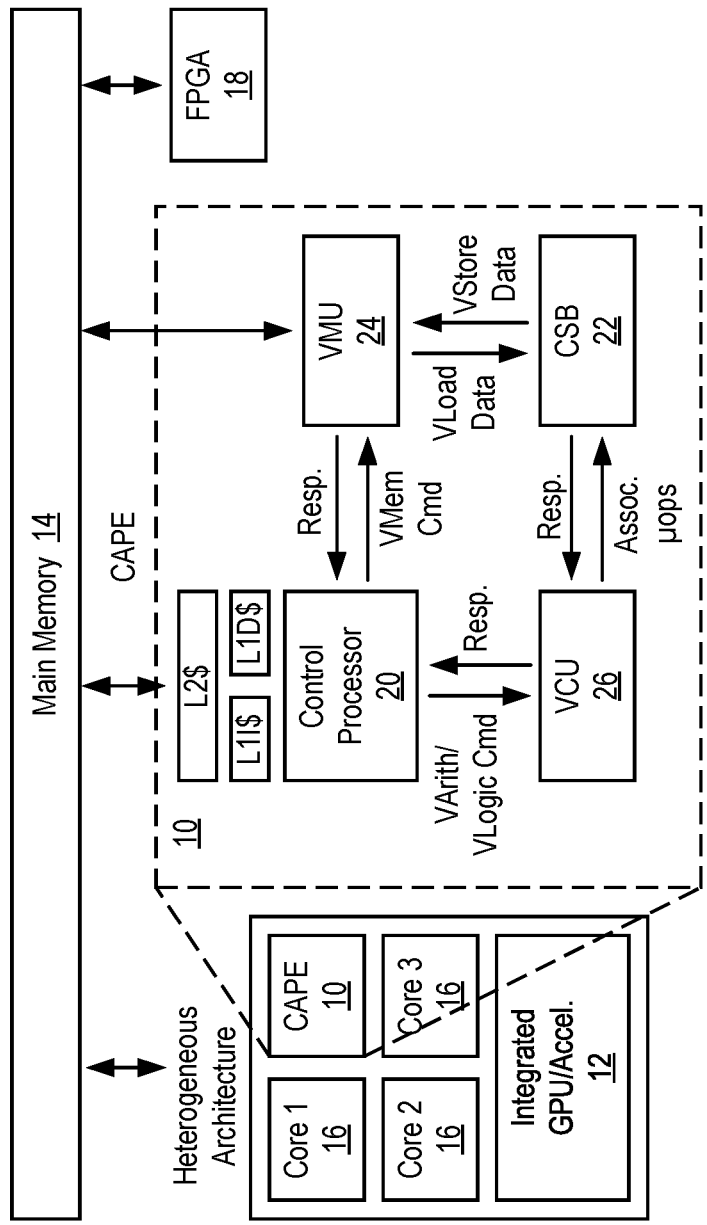
FIG. 2 is a schematic block diagram of an embodiment of a content-addressable processing engine (CAPE).

FIG. 2 is a schematic block diagram of an embodiment of CAPE 10. In the illustrated embodiment, CAPE 10 is deployed in a heterogeneous multi-core processor 12 in communication with a main memory 14. In this regard, the multi-core processor 12 may be any appropriate general purpose processor, such as a central processing unit (CPU) or a graphic processing unit (GPU), generally comprising an integrated circuit with a common semiconductor substrate (e.g., wafer). Other cores 16 of the multi-core processor 12 can therefore include one or more of a CPU core, a GPU core, or another general purpose or specialized processing core.

In other embodiments, the CAPE 10 is deployed in a single or multi-core processing device, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device incorporating the CAPE 10 may be implemented as a combination of computing devices (e.g., the multi-core processor 12 and an FPGA 18, a combination of a DSP and a microprocessor, a plurality of microprocessors, one or more microprocessors in conjunction with a DSP core, or any other such configuration).

The architecture of CAPE 10 comprises four main blocks. A control processor 20 is a small in-order core that runs standard RISC-V code with vector extensions. The control processor 20 processes scalar operations locally, and off-loads vector operations to a compute-storage block (CSB) 22, which acts as a coprocessor and is the associative computing engine of CAPE 10. A vector operation commits in the control processor 20 only after it completes in the CSB 22. In the shadow of an outstanding vector operation, subsequent scalar logic/arithmetic operations may issue and execute (if not data-dependent with the vector instruction), but not commit. Subsequent vector operations, however, stall at issue until the outstanding vector operation commits. In some embodiments, the CAPE 10 hardware provides for bit-serial pipelining and/or chaining across vector operations.

Load and store vector operations en route to the CSB 22 pass through a vector memory unit (VMU) 24. Other vector operations go through a vector control unit (VCU) 26, which generates microcode sequences to drive the CSB 22 and carry out the appropriate operations. The VMU 24 and the VCU 26 generate and transfer control and data signals to the CSB 22. The RISC-V vector register names in each instruction are used to index appropriate vector operands within the CSB 22. These ultra-long vectors (order of $10^4$ vector elements) are a primary source of parallelism in CAPE 10.

The CSB 22 is composed of tens of thousands of associative subarrays which can perform massively parallel operations. In an exemplary aspect, each subarray is made up of 6T bitcells that can readily support the four microoperations used in the computational model of CAPE 10: single-element reads and writes, as well as highly-efficient multi-element (vector) searches and updates.

IV. CAPE's Compute-Storage Block (CSB)

This section describes the low-level organization of an exemplary embodiment of the CSB 22 of CAPE 10. First, a memory cell of the CSB 22 is described, the memory cell being a binary content-addressable memory (CAM) which leverages a dense push-rule 6T SRAM design. Then, an approach is described for arranging these cells and data to optimize for the in-situ searches and updates that constitute the basis of associative computing. Finally, support for reduction operations in the CSB 22, which are a staple of any vector ISA, are described.

A. Cell and Subarray

Compared to standard 6T SRAM cells, traditional CAM cells require extra transistors and wires to enable content search. However, a binary CAM (BCAM) based on push-rule 6T SRAM cells is able to perform reads, writes, and searches while maintaining the density of conventional SRAM. A key difference between this design and a conventional SRAM cell is that each row has two separate wordlines—wordline right (WLR) and wordline left (WLL)—each connected to one of the access transistors of a cell. This design reuses the already existing wordlines as searchlines, and the bitlines as matchlines (the latter requires an AND gate per column).

Figure 3A:
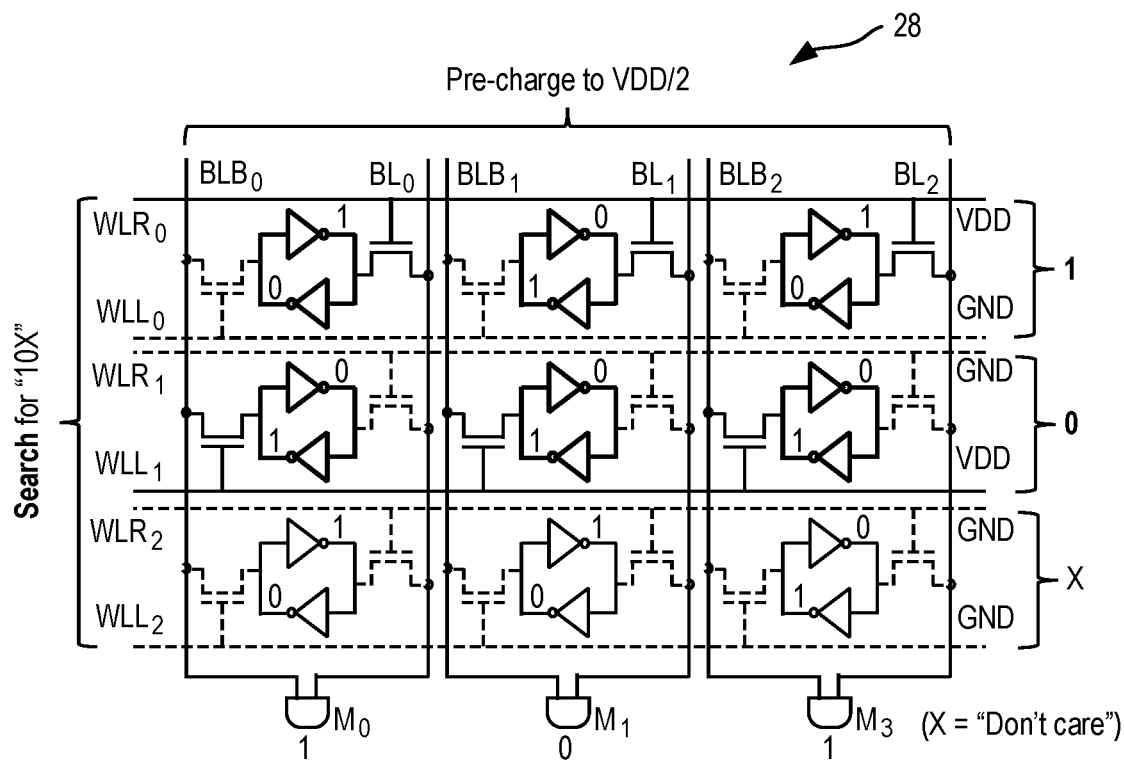
FIG. 3A is a schematic diagram of an exemplary three-by-three six transistor (6T) static random-access memory (SRAM) array performing a search operation.
Figure 3B:
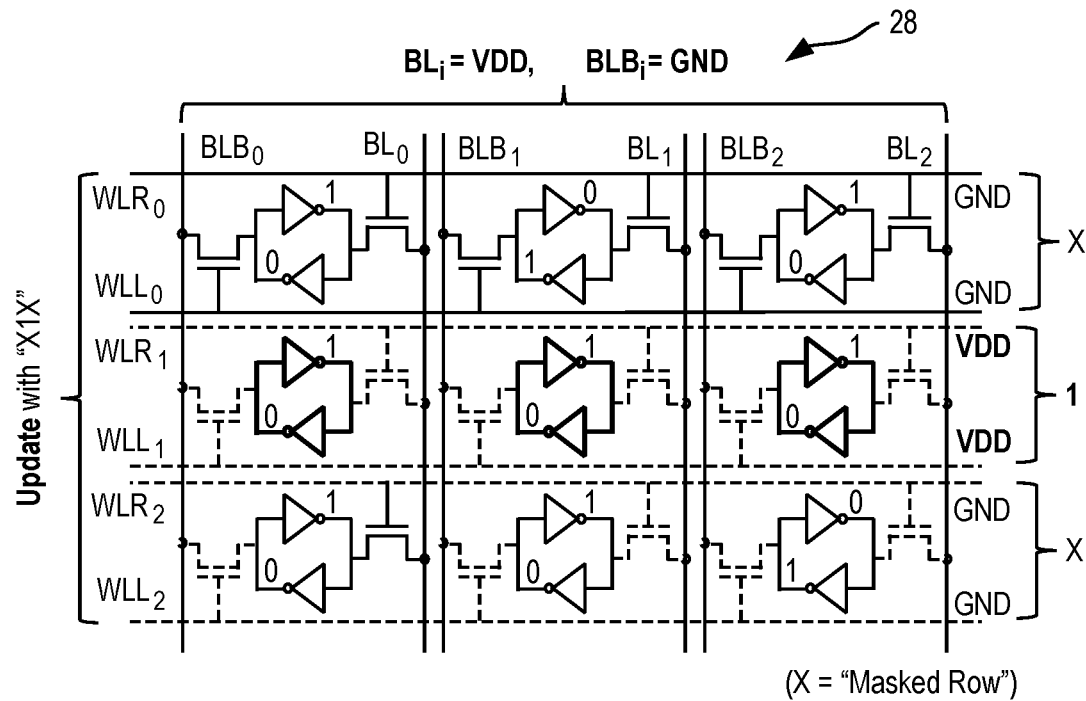
FIG. 3B is a schematic diagram of the memory array of FIG. 3A performing an update operation.

FIG. 3A is a schematic diagram of an exemplary three-by-three 6T SRAM memory array 28 performing a search operation. FIG. 3B is a schematic diagram of the memory array 28 of FIG. 3A performing an update operation. The memory array 28 of FIGS. 3A and 3B includes split wordlines for performing search and update operations (read and write work as expected for a conventional SRAM). For a particular vector, embodiments of CAPE 10 store vector elements across columns; thus, different rows mean different bits of a vector element.

A search operation will look for matches in every column at the same time. In order to search for a 1, the illustrated example of FIG. 3A sets WLR to a logic high (e.g., VDD) and WLL to a logic low (e.g., GND). To search for a 0, WLR is set to GND and WLL is set to VDD. To exclude a row from a search ("don't care"), both WLR and WLL are set to GND. At each column, ANDing bitlines BL and BLB yields the outcome of the search for each column: 1 for a full match, or 0 for at least one bit mismatch.

To perform a bulk update across all columns, the illustrated example of FIG. 3B asserts both WLR and WLL of the active rows to be updated. In order to write a 1, all BL are set to VDD and all BLB are set to GND. In order to write a 0, all BL are set to GND and all BLB are set to VDD.

B. Data Layout

In an exemplary embodiment (e.g., a 32-bit embodiment), the CSB 22 is laid out in subarrays of 32 by 32 cells (plus some peripheral logic, as described below). Further, each vector element is bit-sliced across subarrays of the same column, such that subarray i will store the ith bit of the vector elements of all 32 RISC-V vector names for that column. Thus, each 32×32 subarray contains the ith bit for 32 contiguous vector elements of all vector names. For example, subarray $S_{ki}$ contains the ith bit of v0–31[32·k], v0–31[32·k+1], . . . , v0–31[32·k+31]. The total number of subarrays in the CSB 22 is the number of vector elements in a vector, times the bit width of each vector element, divided by 32. In some embodiments, the CSB 22 includes multiple banks of this size, where vectors are dynamically renamed across banks.

This 32 by 32 geometry, combined with the bit-sliced data layout, allows CAPE 10 to be clocked fast and minimize data movement: 1) The access latency of a subarray is kept low. 2) Further, a search-update pair that is part of a bit-serial instruction can be performed locally by the subarrays that contain the ith bit of all the vector elements involved, and the other subarrays can be in sleep mode. Some examples instead support bit-serial pipelining across instructions. 3) Finally, logic instructions (e.g., bitwise XOR) can be carried out in a bit-parallel fashion, thus involving all subarrays simultaneously.

FIG. 4A is a block schematic diagram of bit-vector active operands for bit-serial search on an exemplary CSB 22. FIG. 4B is a block schematic diagram of bit-vector active operands for bit-parallel search on the CSB 22. FIG. 4C is a block schematic diagram of bit-vector active operands for bit-serial update on the CSB 22. FIG. 4D is a block schematic diagram of bit-vector active operands for bit-parallel update on the CSB 22.

FIGS. 4A-4D illustrate a simplified example of the CSB 22 structure, showing one subarray 30. FIGS. 4A and 4C perform a search-update pair as part of the increment instruction example of Section II. Each vector element is laid out vertically in a bit-sliced fashion, and for each vector its vector elements reside in different bit columns 32 (some in different bit columns 32 of the same subarray 30, and some in different subarrays (not shown)). In FIG. 4A, the search operation looks for a particular combination of bits $v0_i$ (data) and $c_i$ (carry) on every vector element of v0 and c, respectively. Once the matching vector elements have been identified (which is recorded using tag bits, not shown), a bulk update (FIG. 4C) simultaneously updates bits $v0_i$ and $c_{i+1}$ of every matching vector element. At each step, the subarrays 30 not involved in the operation can potentially be placed in sleep mode.

FIGS. 4B and 4D show another example involving a logic operation (e.g., v4=v2∧v3). As indicated before, logic operations can be carried out in a bit-parallel fashion, and thus all subarrays 30 are involved.

C. Peripheral Logic

Figure 5B:
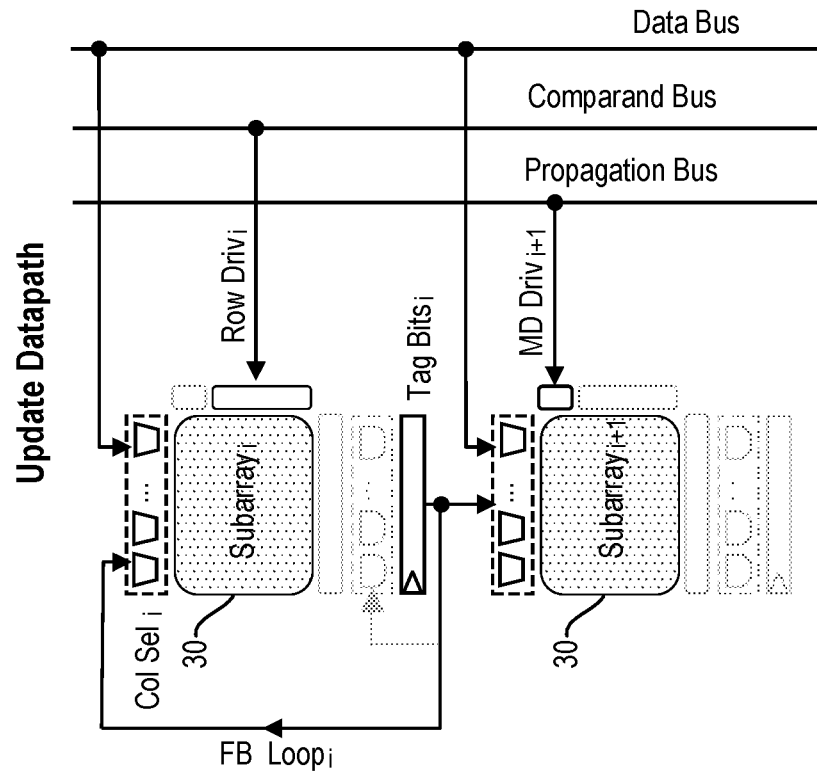
FIG. 5B is a block diagram of an exemplary update path for subarrays of the CSB.
Figure 5A:
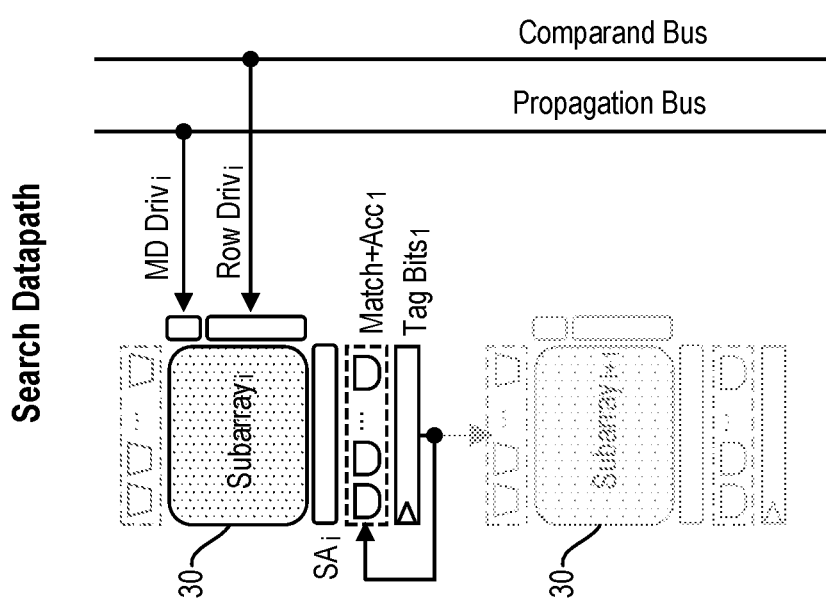
FIG. 5A is a block diagram of an exemplary search path for subarrays of the CSB.

FIG. 5A is a block diagram of an exemplary search path for subarrays 30 of the CSB 22. FIG. 5B is a block diagram of an exemplary update path for subarrays 30 of the CSB 22. Each subarray 30 contains peripheral logic, which can include a match generator (Match) with one AND gate per column to generate a match/mismatch signal. The peripheral logic can further include tag bits with one flip-flop per column to store the output of the match generator. The peripheral logic can further include a tag bit accumulator (Accum) with one OR gate per column to accumulate searches that update with the same values. A feedback loop (FB Loop) is used during updates to transfer the match/mismatch mask generated by searches to the input of its own column driver (BL/BLB).

D. Propagation Chain

Typically, bit-serial instructions carry over information from one step to the next (e.g., carry in a bit-serial increment). Because embodiments bit-slice vector elements, they need to support communication of such metadata vertically across consecutive subarrays 30, and the subarrays 30 of a column thus form a propagation chain. In general, a chain will have as many subarrays 30 as the bit width of a vector element. To support this, logic is added to optionally allow the tag bits of subarray i to select the columns of subarray i+1 that should be updated (FIG. 5B). This is how, in the increment example on FIG. 1, the tag bits generated in the search can be used to select the vector elements to be updated for both subarray i (to update $v0_i$) and subarray i+1 (to update $c_{i+1}$) of every chain.

E. Supporting Reduction Sum Operations

Figure 6:
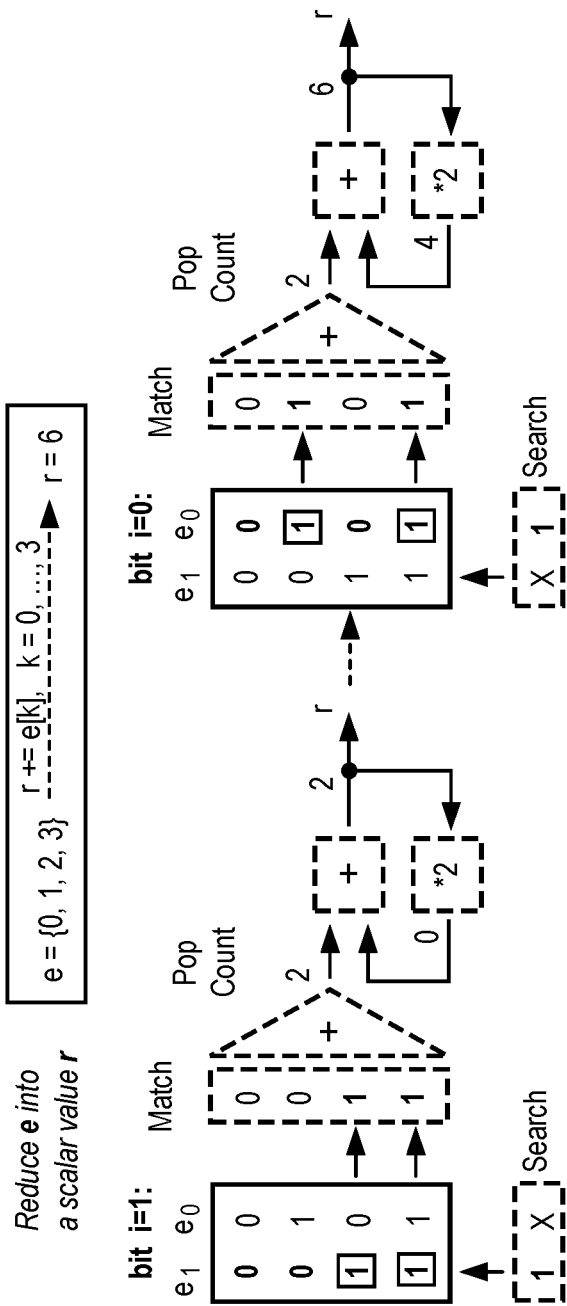
FIG. 6 is a block diagram of a reduction sum operation of a four-element two-bit vector according to embodiments described herein.

FIG. 6 is a block diagram of a reduction sum operation of a four-element two-bit vector according to embodiments described herein. The CSB 22 supports reduction sum (redsum) operations, which aggregate the elements of a vector by adding them to produce a scalar result. This algorithm flows from the most to the least significant bits of the input, and the steps for each bit are: 1) search for '1' on each bit i (mask the rest); 2) the tag bits are reduced into an integer value; and 3) the output of the pop count is accumulated and multiplied by 2 at each step.

CAPE 10 supports redsum operations across chains, using external logic composed by: one pop count per chain, a left shift block (to multiply by two), an adder, and a register to store the scalar result. Section VI gives details on a specific redsum logic implementation used on a system made up of thousands of chains.

V. CAPE Architecture

This section describes an exemplary mapping of the RISC-V vector abstraction to the CSB 22 (Section IV). This section further describes the micro-architecture of the VCU 26 (Section V-C) and VMU 24 (Section V-D), which generate control commands for the CSB 22 and enable efficient data transfers to/from the CSB 22, respectively.

A. Instruction Set Architecture (ISA)

Vector architectures have been around for decades, and code vectorization is a well understood way to express data parallelism. This suggests that a vector ISA abstraction of the CAPE architecture is an attractive way to make CAPE 10 highly programmable and versatile. Recently, the RISC-V Foundation released a specification for RISC-V vector extensions. Because of its increasing popularity, free availability, and support for vector extensions, RISC-V is chosen as the ISA abstraction for an exemplary embodiment of the CAPE 10 architecture.

RISC-V vector names map to the appropriate CAPE 10 locations transparently through the VCU 26; the programmer never sees the CSB 22 as addressable memory (although CAPE 10 can be configured alternatively to be used as a memory-only tile by the chip, as described in Section VII). RISC-V's vector-length agnostic (VLA) support, whereby vector length is programmable, is easily supported in CAPE 10 by simply masking out the unused CSB 22 columns or turning off entire chains. The flexibility that VLA support provides is actually key to the ability of CAPE 10 to accommodate a variety of applications with different amounts of data-level parallelism.

Table I shows relevant metrics of an illustrative subset of RISC-V instructions supported by CAPE 10. Note that logic instructions are very efficient, because their execution is bit-parallel. Generally, arithmetic instructions are bit-serial due to the need to propagate carry/borrow information. Comparison instructions map directly to the bit-parallel search operation of CAPE 10 (FIG. 4B). However, since each vector element is bit-sliced, there needs to be a bit-serial post-processing of each of the tag bits in order to generate a single match/mismatch value.

The maximum number of active rows/subarrays 30 during update and search illustrates that the circuits need only be able to search to at most four rows and to update to one row. This also the case for the RISC-V vector instructions not shown in Table I. Note that arithmetic instructions (i.e. vadd.vv) will update to two subarrays 30 simultaneously, but to only one row/subarray 30. The truth table entry count corresponds to the number of search-update pairs needed to execute per bit of the input operands; it is an estimation of the instruction's complexity. While some instructions have smaller truth tables than others, they may traverse them multiple times (for example, vmul.vv traverses its truth table a quadratic number of times, compared to vadd.vv).

TABLE I

Metrics of a subset of RISC-V vector instructions supported by CAPE

| | RISC-V vector Inst | Truth Table Ent. | Active Rows/Sub | | Red Cycles (n bits) | Total Cycles (n bits) | Per-lane E (pJ) |
| --- | --- | --- | --- | --- | --- | --- | --- |
| | | | Srch | Upd | | | |
| Arith. | vadd.vv | 5 | 3 | 1 | 0 | 8n + 1 | 8.4 |
| | vsub.vv | 5 | 3 | 1 | 0 | 8n + 1 | 8.4 |
| | vmul.vv | 4 | 4 | 1 | 0 | $3n^2 - n$ | 99.9 |
| | vredsum.vs | 1 | 1 | 0 | n | ~n | 0.4 |
| Logic | vand.vv | 1 | 2 | 1 | 0 | 3 | 0.4 |
| | vor.vv | 1 | 2 | 1 | 0 | 3 | 0.4 |
| | vxor.vv | 2 | 2 | 1 | 0 | 4 | 0.5 |
| Comp. | vmseq.vx | 1 | 1 | 0 | n | n + 1 | 0.4 |
| | vmseq.vv | 2 | 2 | 1 | n | n + 1 | 0.5 |
| | vmslt.vv | 5 | 2 | 1 | 0 | 3n + 6 | 3.2 |
| Other | vmerge.vv | 4 | 3 | 1 | 0 | 4 | 0.5 |

B. CAPE Micro-Architecture

As previously described above with respect to FIG. 2, the CAPE 10 system is organized into four blocks: the control processor 20, the VCU 26, the VMU 24 and the CSB 22. The CSB 22 is made up of CAPE 10 chains which have already been described in Section IV-D. Sections V-C and V-D describe in detail the VCU 26 and the VMU 24.

C. Vector Control Unit (VCU)

Figure 7:
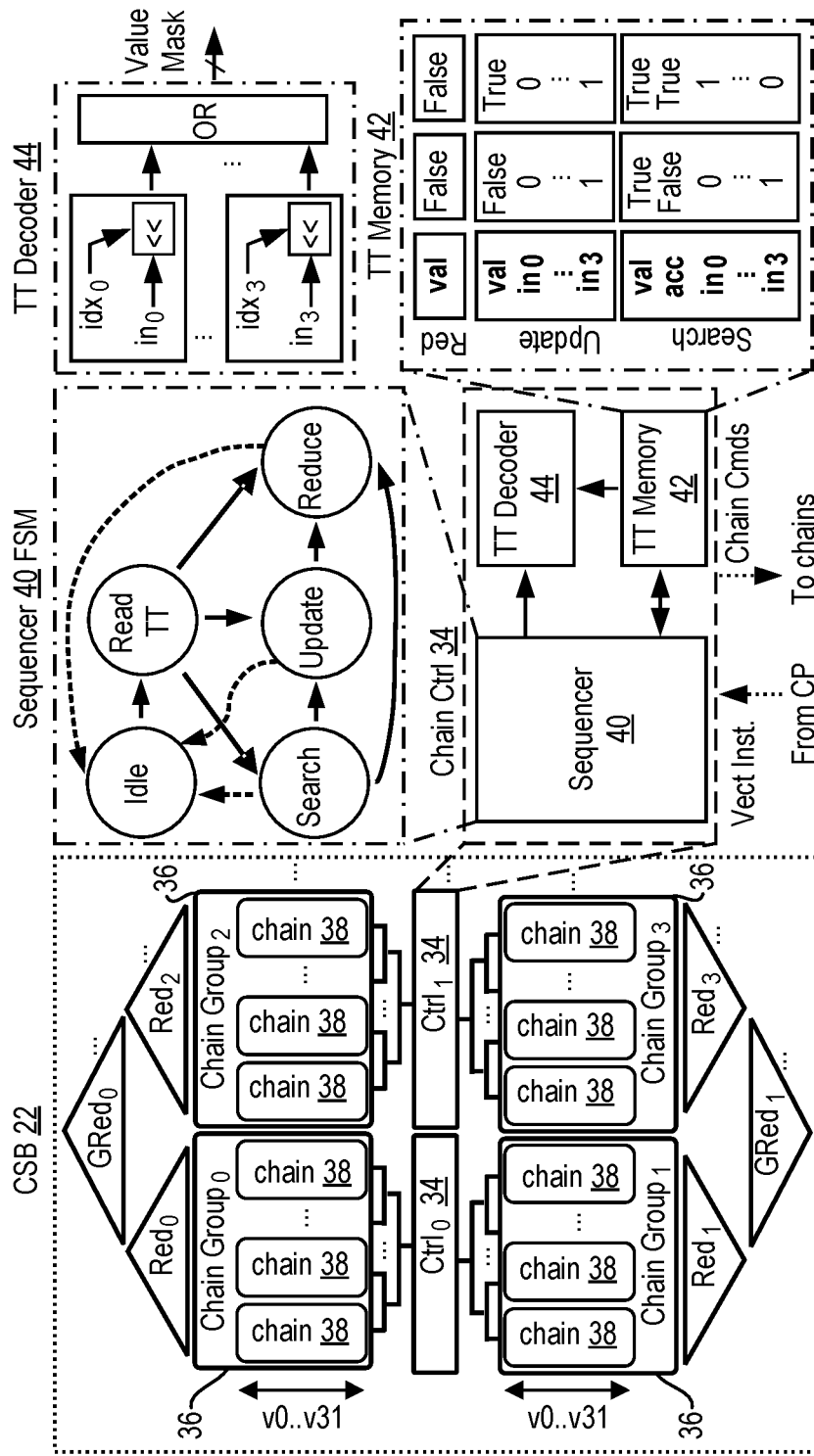
FIG. 7 is a schematic diagram of an exemplary vector control unit (VCU).

FIG. 7 is a schematic diagram of an exemplary VCU 26. The VCU 26 breaks down each vector operation into a sequence of commands (e.g., a signal sequence). Commands include the four CAPE 10 microoperations (read, write, search and update), as well as reconfiguration commands (e.g., to reconfigure the vector length). The illustrated embodiment implements a distributed design of the VCU 26, built from multiple chain controllers 34, shared across chain groups 36. A global control unit maintains a programmable truth table memory and a set of control status registers (CSRs). When the VCU 26 receives a vector operation, it propagates the truth table data of the corresponding associative algorithm to each of the chain controllers 34 which store it in a small, dedicated CAM (global command distribution).

1. Chain Controllers

The chain controllers 34 then distribute the commands to the appropriate subarray(s) 30 in a chain 38 (local command distribution). The chain controller 34 is composed of a sequencer 40, a truth table memory (TTM) 42, and a truth table decoder 44. Each TTM 42 entry corresponds to one search-update-reduce data pack, encoded efficiently to only store values for the bits involved in the operations. The entries in the TTM 42 use a standard format to represent any associative algorithm's truth table. Four additional bits per TTM 42 entry (valid bits and accumulator enable) are used to indicate if a search (with/without accumulation) or update operation is active, and if the reduction logic is going to be used.

2. Sequencer

The sequencer 40 implements a simple finite-state machine (FSM) with five states: 1) idle, 2) read TTM, 3) generate comparand and mask for search, 4) generate data and mask for update, and 5) reduce. The sequencer 40 is by default in idle state. Once the control processor 20 sends a new request, the sequencer 40 transitions into state 2. The chain controller 34 keeps track of one counter, μpc, which helps navigate the entries in the TTM 42, and another counter, bit, to keep track of the bit being operated on and generating the appropriate idx and subarray select signal for the chain controller 34. The counters are initialized appropriately: μpc=0 every TT-loop, and bit is set to either MSB or LSB, depending on the operation, given an operand size.

3. Truth Table Decoder

The truth table decoder 44 produces the search and update data and masks, from the values stored in the TTM 42 by shifting them by the appropriate amount and ORing them to generate a single digital word to be used by the subarray 30 row and column drivers. This approach is similar to a vertical micro-code scheme. On a 32-bit configuration, the chain controllers 34 distribute 143 bits of commands through the chain command buses, as shown in FIG. 7.

D. Vector Memory Unit (VMU)

CAPE 10 communicates with the main memory 14 via the VMU 24. When receiving a vector memory instruction from the control processor 20, the VMU 24 will break it into a series of sub-requests to the main memory 14. Each sub-request accesses a block of memory of the data bus packet size of the main memory 14. When the sub-request is served to the VMU 24, the CSB 22 consumes it in the following way. Similar to the byte interleaving scheme across different chips of a dynamic random-access memory (DRAM) dual in-line memory module (DIMM) for optimal throughput, CAPE 10 stores adjacent vector elements in different chains 38, which have the ability to perform the transfer independently, in a single cycle. This allows for the vector loads and stores to complete a full sub-request transfer in a single cycle.

The system is designed in order to ensure that the sub-request size is smaller than the total number of chains 38, so that sub-requests do not need to be buffered in the VMU 24. The VMU 24 is non-blocking, and therefore CSB 22 reads and writes are concurrent to the main memory 14 data transfers.

The CSB 22 of CAPE 10 is cache-less. Due to the large footprint of the vector memory request and the limited temporal locality, it is not beneficial to have a data cache between CAPE 10 and the main memory 14. As a result, the VMU 24 is directly connected to the memory bus, and follows the same cache coherence protocol as the caches in the control processor 20. Nonetheless, cache coherence introduces very trivial performance overhead, since the CSB 22 and the control processor 20 share small amounts of data. Moreover, vectorization reduces the temporal locality of the code negating the potential benefits of having a cache.

E. Reconfigurable Active Window

1. Set Vector Length

Variable-length vectors allow for applications to request a desired amount of data parallelism. In order to modify the vector length (vl), programmers can use the standard RISC-V instructions vsetvl or vsetvli, which will return the maximum amount of lanes supported by the hardware (MAX_VL) or the exact amount requested, if it is smaller than MAX_VL. In CAPE 10, that translates into using more or fewer columns, or even full chains 38. Following the RISC-V standard documentation, the elements in any destination vector register with indices ≥vl remain unchanged.

2. Set Vector Start

Similarly to MAX_VL, RISC-V's standard CSR vstart is used to specify the index of the first active element in a vector instruction.

3. CAPE Support for the Active Window

Setting a vl smaller than its hardware limit MAX_VL, will mask columns that are stored in different chains 38. To implement that, each chain controller 34 locally computes a mask given its chain ID, the vstart value, the vl value, that is used in updates to generate the column signal: the address bus signals will contain 0s on the masked columns. If all elements in a chain 38 are masked, the chain controller 34 can power gate its peripherals while still maintaining the data stored unchanged.

F. Vectorizing for CAPE

Programmers can use vector intrinsics or a vectorizing compiler to map well-structured data-parallel code to the CAPE 10 instruction set. Many classic vector optimization techniques will directly apply to CAPE 10, including loop reordering, loop restructuring, and memory access transformations. This section discusses two CAPE-specific optimizations that can improve performance when compared to traditional vector architectures.

1. Vector Vs. Horizontal Operations

Traditional vector architectures discourage horizontal (i.e., cross-lane) operations since they are usually implemented using expensive and slow reduction trees. The horizontal operations of CAPE 10 use a combination of an intra-chain 38 redsum primitive and a modest global bit-serial reduction tree (see Section IV-E). The ability to bit-serially reduce all rows of all chains 38 simultaneously results in performance roughly proportional to the bitwidth (implementation details of the reduction tree for a system of 1,024 chains 38 are given in Section VI-C). A vector reduction sum instruction is thus ▯ 8× faster than an element-wise vector addition. This trade-off opens new algorithmic optimizations which favor using vector reduction sum instructions when possible.

2. Replica Vector Load

It can be challenging to fully utilize the long vector registers of CAPE 10 when applications operate over matrices with a modest number of elements in each dimension. CAPE 10 includes a new replica vector load instruction (vlrw.v vl, r1, r2) which loads a chunk of r2 contiguous values, starting from the address in r1, and replicates them along the vector register v1. Replica vector loads are particularly useful when vectorizing dense matrix multiplication in three steps: (1) a unit-stride vector load reads multiple rows from the first matrix into one vector register; (2) a replica vector load reads a single row from the (transposed) second matrix and replicates this row into a second vector register; and (3) iterate over the rows and use vmul and vredsum to efficiently calculate the partial product.

VI. Evaluation

This section discusses circuit, instruction, and system modeling. Microoperation modeling provides delay and energy estimates for each CAPE 10 microoperation on one chain 38. Instruction modeling combines these circuit-level estimates with an associative behavioral emulator to estimate the delay and energy for each vector instruction. System modeling integrates these instruction-level estimates into a gem5-based cycle-approximate simulation model capable of executing binaries for both micro-benchmarks and complete applications. This multi-level modeling approach is used to explore system-level trade-offs.

A. Microoperation Modeling

A memory subarray 30 of 32 columns×36 rows (32 rows–1 row/vector name, and 4 additional rows for metadata) is simulated based on the 6T bitcell design with split wordlines of FIG. 3. A CAPE 10 subarray 30 consists of SRAM bitcells, precharge circuitry, write drivers, search AND gates, tag bit accumulator and tag bits. All of these are designed using ASAP 7 nanometer (nm) PDK circuit simulation libraries. The latency and energy results incorporate wordline, bitline resistance and capacitances.

This subarray 30 is then modeled as a black box and instantiated in the synthesized chain 38 design using Synopsys DC compiler. Synthesis results are further fed into an auto-place and route tool for floorplan and placement to generate a chain 38 layout. The control signals are routed to all the subarrays 30 which are driven by wire repeaters to reduce the overall delay.

1. Delay of CAPE Primitives

Conventional wisdom might suggest that parallel microoperations (i.e. search and update) should be significantly slower (perhaps 32× since they might operate on 32 elements per chain 38) than reads or writes. In CAPE 10, both the circuit design and data layout enable very efficient searches and updates, since they are done across columns (with their own independent circuitry) and not rows. Searches are only done to at most four rows simultaneously, which speeds up the sensing of the search outcome.

Updates write to at most one row per subarray 30, which essentially turns them into single-row conventional writes. In addition, updates do not use a (priority) encoder or address decoder, but rather re-use the outcome of searches (stored in the tag bits) to conditionally update columns. Overall, the microoperation delays of CAPE 10 are balanced and range between 181 and 237 picoseconds (ps) (Table II).

The reduced size of the SRAM arrays enables very fast accesses (90 ps). For that reason, microoperation delays are largely dominated by the peripheral logic (i.e. AND gates, OR gates, flip-flop) and the local command distribution delay of the control signals (55 ps). Read is the slowest microoperation (Table II), explained by the round-trip wire delay: once to transfer the control signals to all subarrays 30, and another one to transfer back the data read to the controller.

TABLE II

Delay (D) and dynamic energy of bit-serial (BS E) and bit-parallel (BP E) microoperations executed by one chain

|         | Read | Write | Search 4 Rows | Update w/o Prop | Update w/ Prop | Red |
|---------|------|-------|---------------|-----------------|----------------|-----|
| D (ps)  | 237  | 181   | 227           | 209             | 209            | 217 |
| BS E (pJ) | —  | —     | 1.0           | 1.2             | 1.2            | —   |
| BP E (pJ) | 2.8 | 2.4  | 5.7           | 3.8             | —              | 8.9 |

2. Energy of CAPE Primitives

The operand bit-slicing across the subarrays 30 in a chain 38 forces reads and writes to access a single bitcell (same row and column) of all subarrays 30 in a chain 38. In turn, the same data layout allows for search and updates to maintain most subarrays 30 in a chain 38 idle, reducing the dynamic energy. For searches, only one subarray 30/chain 38 will be active (because of operand locality); and for update, only one or two (if propagation is needed) subarrays 30/chains 38 will be active.

Dynamic energy estimates of a single chain 38 are shown in Table II, which include local command distribution of the 184 bits to all subarrays 30, array access, as well as peripheral logic energy consumption. Estimates are shown for dynamic energy of the bit-serial (BS E) and bit-parallel (BP E) flavors of each microoperation. Note that bit-parallel microoperations are very energy efficient given the shared control logic and command distribution.

B. Instruction Modeling

The chain 38 layout, delay, and energy modeling from the previous section are used and combined with the associative behavioral emulator to derive detailed ISA instruction-level energy and delay modeling for an entire chain 38.

1. Delay of CAPE Instructions

The associative emulator models the associative behavior of subarrays 30 with read, write, search and update capability. The associative algorithms required for each vector instruction are implemented and microoperation mix count is extracted for a configuration of 32-bit operand.

2. Energy of CAPE Instructions

The associative emulator's microoperation statistics are combined with the microoperation energy modeling in Table II to estimate the energy of each CAPE 10 instruction executing on a single chain 38.

3. Dynamic Energy of the Chain

Table I shows the energy spent for each vector instruction per scalar operation (that is, per vector lane). As expected, arithmetic instructions are the most energy consuming explained by their large cycle count. Vector multiplication is clearly the most energy expensive instruction, it performs more than 3,000 searches and updates, combined. Logic instructions (vand, vor, vxor) are very efficient, since they perform very few (bit-parallel) microoperations. vredsum includes the energy consumed in doing the bit-parallel search, 3.0 picojoules (pJ), as well as the energy consumed by the reduction logic, 8.9 pJ.

4. CAPE Cycle Time

The system's critical path is 237 ps (4.22 gigahertz (GHz)), which corresponds to the slowest microoperation (read). The maximum CAPE 10 frequency is conservatively reduced by 65% to 2.7 GHz to account for clock skew and uncertainty.

C. System Modeling

The modeling from the previous sections is used to derive global reduction logic and command distribution models as well as a system-level simulation framework.

1. Reduction Logic

The global reduction logic described in Section IV-E is synthesized for a system of 1,024 chains 38. The global reduction is pipelined into 5 stages with a critical path of 217 ps. The number of stages to model different CSB 22 capacities are estimated by replicating or removing the different pipeline stages.

2. Global Command Distribution

Global command distribution includes the delay between the VCU 26 and each of the chain controllers 34, and it is estimated using a first-order approximation of wire delay on Metal 4 of an H-Tree that distributes the VCU 26 signals control to each of the chain controllers 34, using wire repeaters to improve the delay. The global command distribution is pipelined and is not included as part of the cycle time: it adds a constant number of cycles of overhead per vector instruction.

3. System Methodology

The CAPE 10 system is modeled by extending the gem5 cycle-approximate simulator framework. The control processor 20 is modeled using the RISC-V RV64G MinorCPU (described in N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The gem5 Simulator," *SIGARCH Computer Architecture News*, 2011) and is configured as a dual-issue, in-order, five-stage pipeline. The MinorCPU is modified to send commands to the VMU 24 or VCU 26. The simulator accurately models the global reduction tree and command distribution delays. Detailed models of the VMU 24, VCU 26, and CSB 22 of CAPE 10 are developed.

The VMU 24 is connected to a high bandwidth memory (HBM) memory system (as described in J. Kim and Y. Kim, "HBM: Memory solution for bandwidth-hungry processors") to perform data transfers to/from the CSB 22. The CSB 22 delays of each vector instruction are modeled as described in Section VI-B.

4. Area Reference

It is desirable to make area-equivalent comparisons. To that end, the area of the baseline out-of-order CPU is estimated based on a high-end Intel Skylake processor in 14 nm technology. Each Skylake tile contains a CPU core, more than 1 MB of private caches, and 1.375 MB of shared LLC. To scale down the tile area to 7 nm, an estimated scaling factor of 1.8× is applied based on the area ratio between 14 nm and 7 nm High-Density SRAM bitcells. Furthermore, the area is subtracted for AVX and floating-point support. (Later in the section, the impact of adding an aggressive single-instruction multiple-data (SIMD) engine to the baseline is assessed, using a commercial-grade model and assuming no extra area overhead.) As a result, one tile's area is estimated at about 8.8 square millimeters ($mm^2$).

5. CAPE32k and CAPE131k

Two design points of CAPE 10—CAPE32k and CAPE131K—are chosen, corresponding to two different available vector length MAX_VL: 32,768 lanes and 131,072 lanes. Their CSBs 22 have 1,024 and 4,096 chains 38 respectively, with 4.5 and 18 MB of capacity. From the microoperation modeling (Section VI-A), one chain 38 in CAPE 10 takes 2,434 square microns ($\mu m^2$). Therefore, the CSB 22 of CAPE32k including the pipelined reduction tree takes 2.8 $mm^2$, whereas the area of CAPE131k's CSB 22 is 11.3 $mm^2$.

The area of the control processor 20 is then estimated based on an in-order advanced RISC machine (ARM) Cortex-A53 core. One such core built in 16 nm takes 0.6 $mm^2$ whereas 512 kB L2 takes 0.7 $mm^2$. The area is scaled down to 7 nm by 2.74× based on 16 nm and 7 nm HD SRAM bitcell area. In total, the area of the control processor 20 with 1 MB L2 is around 0.73 $mm^2$.

The total area of micro-memory in VCU 26 is estimated based on the truth table entry count of all the vector instructions that CAPE 10 supports. Each entry requires twelve 7 nm SRAM bitcells (FIG. 7). The total area requirement of the TT memory in the VCU 26 is merely 0.002 and 0.007 $mm^2$ for CAPE32k and CAPE131k.

Since the total area of CAPE32k's CSB 22, control processor 20 and TT memory is much smaller than one (area-reference) tile—3.5 vs. 8.8 $mm^2$, it is pessimistically assumed that the difference in area is taken up completely by the sequencer 40 and TT decoder 44 in the VMU 24 and VCU 26. The same area budget as in CAPE32k for the VMU 24 and VCU 26 is applied (8.8–3.5 $mm^2$) to similarly estimate the area of CAPE131k, and is overall under the area of two CPU tiles with caches (17.3 $mm^2$). The applications are manually vectorized using RISC-V vector intrinsics, which are run for different CSB 22 capacities (MAX_VL) without any code modifications.

6. Baselines

The baselines are chosen to be general-purpose, area comparable to CAPE32k (and CAPE131k), processing engines: one (and two) RISC-V RV64G out-of-order and 8-issue cores (connected to the same HBM memory system as CAPE 10) running sequential (and pthreads) versions of the applications. When running a parallel (pthreads) version, the plots indicate how many cores are used (up to three, based on the area study above). When sequential codes of the benchmarks are run on the same multicore machine, the extended shared cache capacity of two other (idle) cores are used. Table III summarizes the architectural configuration.

TABLE III

| Experimental setup | | |
|---|---|---|
| | Baseline Core | CAPE's Ctrl Processor |
| System Configuration | out-of-order core, 3.6 GHz 32 kB/32 kB/1 MB L1D/L1I/L2 5.5 MB L3 (shared), 512 B LL cache line | in-order core, 2.7 GHz 32 kB/32 kB/1 MB L1D/L1I/L2 512 B L2 cache line |
| Core configuration | 8-issue, 224 ROB, 72 LQ, 56 SQ 4/4/4/3/1 IntAdd/IntMul/FP/Mem/Br units TournamentBP, 4096 BTB, 16 RAS | 2-issue in-order, 5 LSQ 4/1/1/1 Int/FP/Mem/Br units TournamentBP, 4096 BTB, 16 RAS |
| L1 D/I cache | 8-way, LRU, MESI, 2 tag/data latency | 8-way, LRU, 2 tag/data latency |
| L2 cache | 16-way, LRU, MESI, 14 tag/data latency | 16-way, LRY, 14 tag/data latency |
| L3 cache | 11-way, LRU, 50 tag/data latency, shared | N.A. |
| Main memory | 4H HBM, 8 channels, 16 DBps/512 MB per channel | |

D. Microbenchmarks

Figure 8:
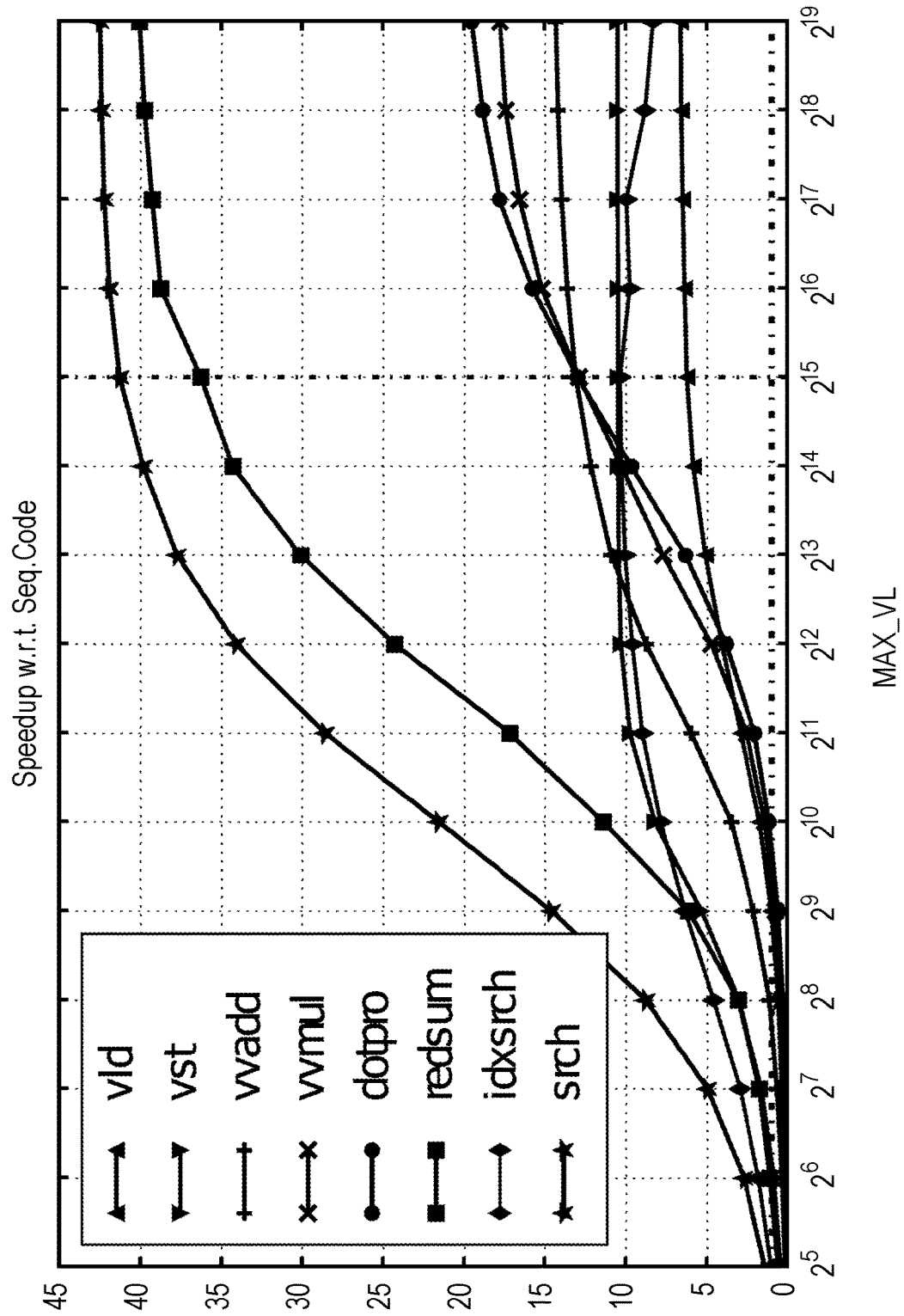
FIG. 8 is a graphical representation of performance microbenchmarks for different CSB capacities.

FIG. 8 is a graphical representation of performance microbenchmarks for different CSB 22 capacities. The bold vertical line corresponds to CAPE32k. CAPE 10 is first evaluated using eight micro-benchmarks, which load one/two vectors with 524,288 32-bit elements each (which fits in the baseline's L3 cache). FIG. 8 shows the performance of CAPE 10 for different CSB 22 capacities (MAX_VL), normalized to the multicore (Table III) running a non-parallel sequential version of the micro-benchmarks. For the baseline experiments, the caches are warmed up before beginning to measure performance.

1. Scalability Study

Memory-intensive benchmarks (vld and vst) show the ability of CAPE 10 to move data in and out of the CSB 22 at different capacity design points. CAPE 10 can achieve a speedup of 6.6-10.5× by efficiently moving large blocks of data from DRAM into the CSB 22 with a single vector instruction, while the sequential baseline requires additional loop overhead and address calculation. In addition, the CPU still needs to serve requests across different levels of the cache hierarchy, even if L3 is warmed up.

Search-based benchmarks (srch and idxsrch) are representative operations of DBMS and text-parsing (i.e. word count) applications. Both perform constant-vector comparisons (vmseq.vx) to search a key in a vector. In addition, idxsrch performs a sequential post-processing for every matching element, with the intention to mimic the behavior of the text-parsing Phoenix applications shown in Section VI-E. The ability of CAPE 10 to search efficiently enables a 42.5× for srch, whereas idxsrch's performance is eventually dominated by the sequential part of the algorithm for larger CSB 22 capacities, achieving a speedup of 10× at MAX_VL=32k.

Arithmetic-intensive benchmarks (vvadd, vvmul, dotpro, and redsum) perform vector-vector addition, multiplication, multiply-accumulate, and reduction sum, respectively (besides loading/storing the input/output data). Their performance suggests that for moderate CSB 22 capacities, the large data-parallelism of CAPE 10 is able to compensate for the bit-serial latencies. For very large CSB 22 capacities ($\geq 2^{16}$), however, global command distribution, reduction overheads, and data transfers limit their performance.

2. CAPE Roofline Model

Figure 9A:
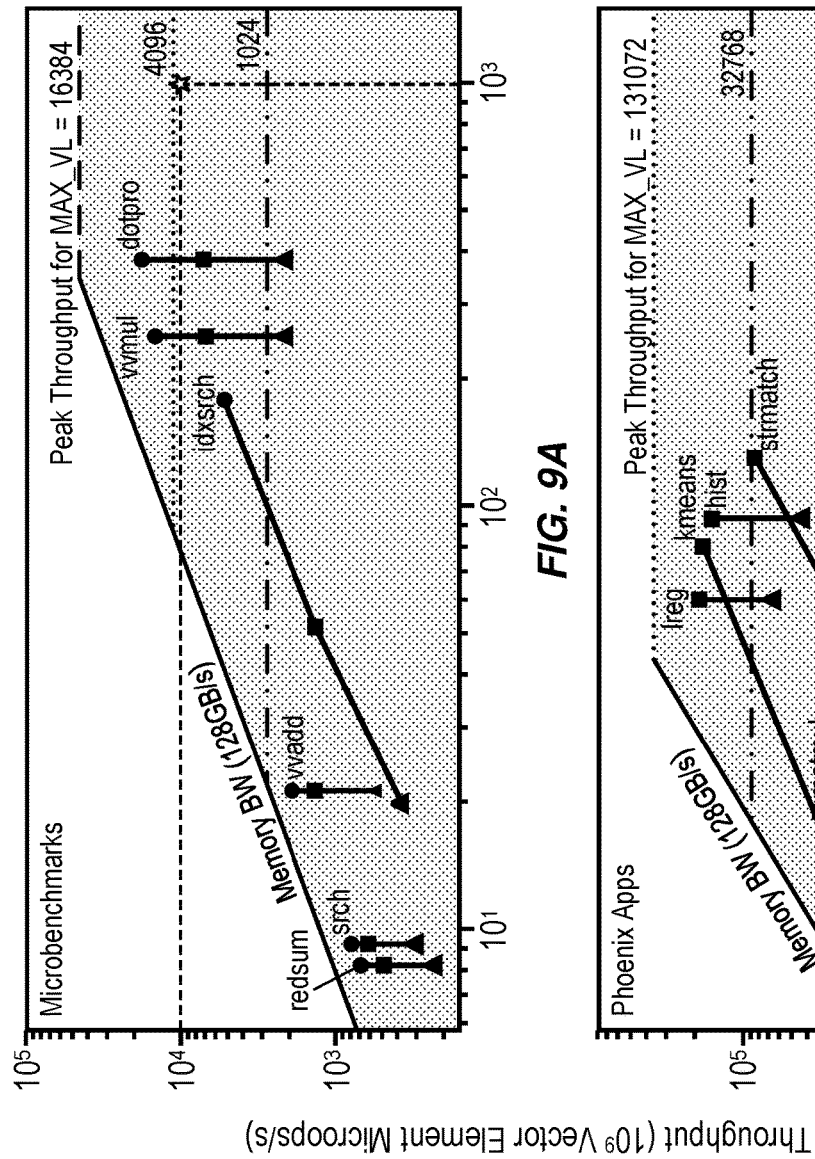
FIG. 9A is a graphical representation of roofline plots of microbenchmarks for CAPE at various CSB capacities.
Figure 9B:
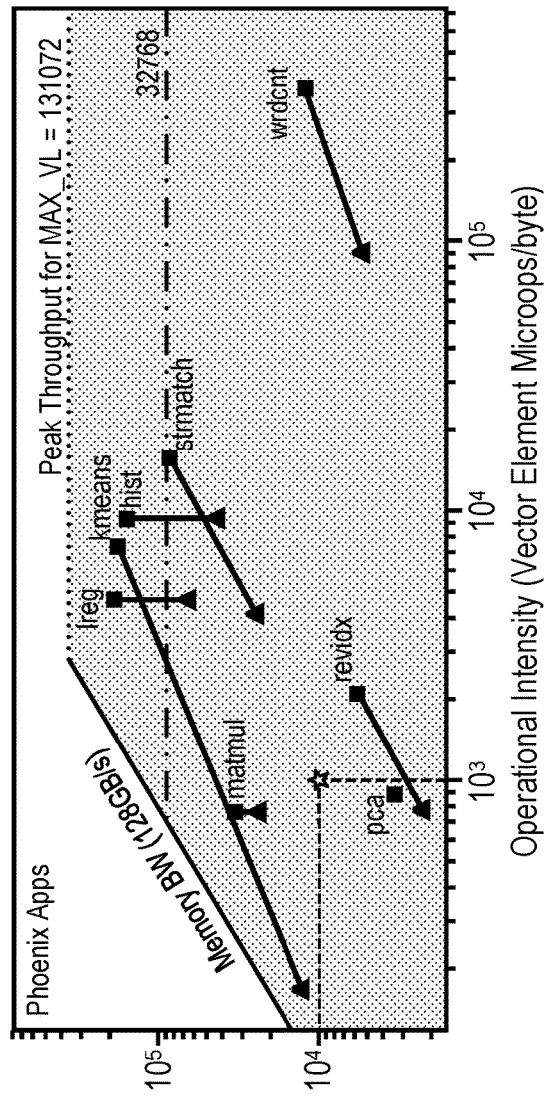
FIG. 9B is a graphical representation of roofline plots of Phoenix applications for CAPE at various CSB capacities.

FIG. 9A is a graphical representation of roofline plots of microbenchmarks for CAPE 10 at various CSB 22 capacities. FIG. 9B is a graphical representation of roofline plots of Phoenix applications for CAPE 10 at various CSB 22 capacities. The star is a random reference point to help reconcile the different axis scales across the two plots. To characterize the computational capabilities and scalability of CAPE 10, a Roofline model is constructed at various CSB 22 capacities, symbolized by different MAX_VL values.

The traditional Roofline model metrics are adapted to capture the peculiarities of CAPE 10. In the context of CAPE 10, a unit of work is defined as a vector element micro-operation (either a search or an update) performed on an element of a vector. The x-axis displays the element micro-operational intensity in vector element microoperations per byte of memory traffic between DRAM and the VMU 24, and the y-axis displays the attainable vector element micro-operational throughput in giga micro-operations per second. Higher intensity leads to higher utilization of data loaded into the CSB 22, and higher throughput suggests that the CSB 22 is able to perform element micro-operations at a higher rate on average. The system's memory bandwidth is dominated by HBM's theoretical peak (128 GB/s). The theoretical maximum throughput of CAPE 10 is obtained from a case that would execute 1 μop/cycle, without control processor 20, VCU 26, and global command distribution overheads.

The microbenchmarks can be classified into two groups: constant-intensity and increasing-intensity, with increasing CSB 22 capacity (MAX_VL). Most benchmarks fall in the first category, explained by the linear decrease in vector instructions as MAX_VL scales up. The second category only contains idxsrch, which still performs a serialized post-processing of each of the matches generated by the parallel search.

As MAX_VL increases, the constant-intensity applications move from the compute-bound region to the memory bound region, and their throughput approaches the memory-bound roofline. This behavior suggests that constant-intensity applications are able to efficiently utilize the increasing computational capabilities of CAPE 10. Ultimately, the speedup plateaus due to the limit of the peak memory BW. This phenomenon demonstrates the need for a high throughput memory system for large CSB 22 capacities, justifying the use of HBM. In contrast, idxsrch remains in the memory-bound region for all MAX_VL, but far from the roofline peak throughput, indicating that it cannot fully utilize the increasing computational capacity of CAPE 10. This explains the poor scalability of idxsrch at larger MAX_VL (FIG. 9A).

E. Phoenix Benchmarks

All the applications in the Phoenix Benchmark Suite are used to evaluate the performance of CAPE 10. Table IV shows the properties of each application.

TABLE IV

Statistics of the Phoenix Benchmark Suite applications

| Application | Input Size | #Cyc. on One O3CPU | #Inst. of Seq. Code |
|---|---|---|---|
| Linear Regression | 500 MB | 4.4 billion | 3.8 billion |
| Histogram | 1.4 GB | 13.6 billion | 13.1 billion |
| Kmeans | 100k | 5.0 billion | 6.6 billion |
| Matrix Multiply | 1000 × 1000 | 7.0 billion | 11.0 billion |
| PCA | 1500 × 1500 | 16.6 billion | 15.2 billion |
| String Match | 500 MB | 68.3 billion | 52.0 billion |
| Word Count | 10 MB | 4.9 billion | 4.1 billion |
| Reverse Index | 100 MB | 0.6 billion | 0.9 billion |

1. Results

Figure 10:
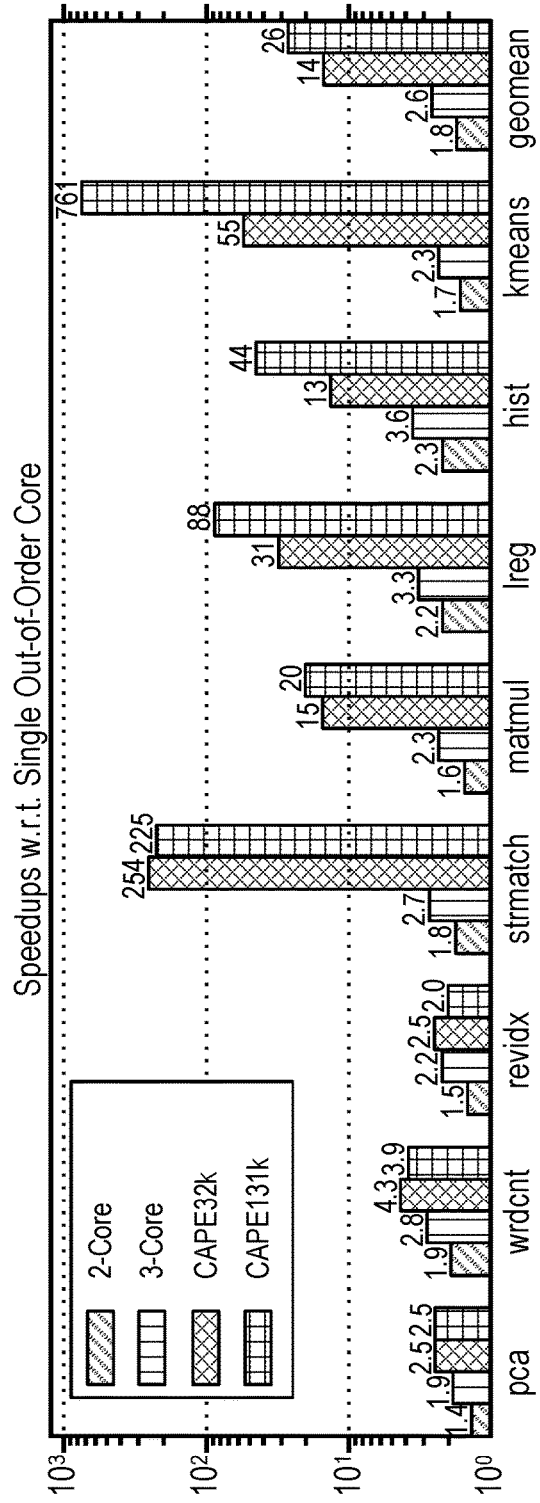
FIG. 10 is a graphical representation of performance of the Phoenix benchmarks for two- and three-core central processing units (CPUs), CAPE32k and CAPE131k, normalized to a single CPU core.

FIG. 10 is a graphical representation of performance of the Phoenix benchmarks for two- and three-core CPUs, CAPE32k and CAPE131k, normalized to a single CPU core. Single- and two-core CPUs are roughly area-equivalent to CAPE32k and CAPE131k, respectively. FIG. 10 shows speedup of CAPE32k and CAPE131k, which have similar area to one and two out-of-order cores with their caches (see baselines in Section VI-C). The performance of a three-core system is also shown for reference.

CAPE32k accelerates all applications by 14× on average, compared to one core, at a similar area design point. Both matrix multiply (matmul) and PCA (pca) are matrix-based applications with relatively small input sizes. However, the for-loop inter-iteration dependencies found in PCA prevented using the CAPE-specific instruction vldr (Section V-F) that increases the vector utilization, enabling a significant increase in parallelism necessary to compensate the bit-serial costly vmul.vv instruction.

CAPE131k accelerates the applications by 14.4× on average, compared to two cores, at a similar area design point. String match (strmatch), word count (wrdcnt) and reverse index (revidx) show worse performance, compared to CAPE32k. This scalability bottleneck is explained by the sequential traversing of the input file, as well as the serialized post-processing of each match (similar to idxsrch of Section VI-D). In turn, the dramatic increase in performance for Kmeans (kmeans) is due to its algorithmic nature.

For CAPE32k, Kmean's dataset does not fit in the CSB 22, which results in having to load it multiple times. Instead, Kmean's dataset fits in CAPE131k's CSB 22, which translates into having to load it one single time and reuse it until the solution converges. In addition, the number of vector instructions inside the for-loops in the program is minimized due to the possibility to fully unroll all the iterations.

2. Comparison with SIMD Baseline

One could argue that CAPE 10 is a vector-first compute core, where non-vector instructions are supported by an adjoining scalar engine (the small control processor 20, already included in the area estimation and the simulations). In contrast, today's CPUs are typically scalar-first compute cores, where vector instructions may be supported by an adjoining vector engine (e.g., Intel AVX or ARM SVE). To tease out whether CAPE 10 indeed constitutes an attractive compute tile for vectorizable code, an additional simulation experiment is conducted using a commercial-grade model of an ARM core with SVE support.

Figure 11:
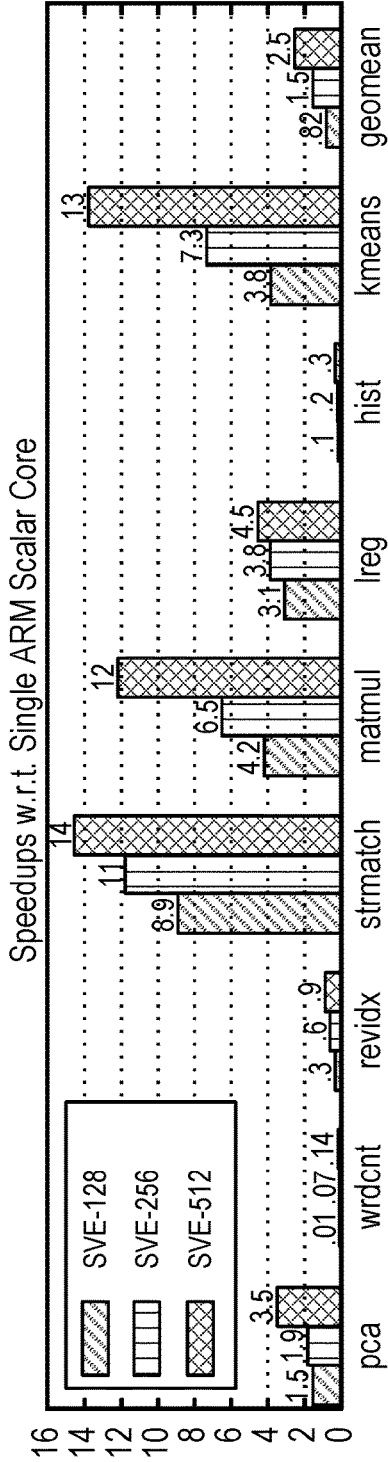
FIG. 11 is a graphical representation of speedups of the Phoenix benchmarks for advanced reduced instruction set computing (RISC) machine (ARM) scalable vector extension (SVE) single-instruction multiple-data (SIMD) implementations of 128-, 256-, and 512-bit vectors normalized to a single-core running ARM scalar code.

FIG. 11 is a graphical representation of speedups of the Phoenix benchmarks for ARM scalable vector extension (SVE) SIMD implementations of 128-, 256-, and 512-bit vectors normalized to a single-core running ARM scalar code. ARM's upstream gem5 model is used for this comparison, configured to match the RISC-V out-of-order baseline's size and latency (Table III), is used and equipped with four SIMD ALUs. The applications are manually vectorized using SVE intrinsics.

Although the standalone core in the ARM configuration is similar to that of the baseline, direct quantitative comparisons are tricky because of the different ISAs and compilation flows. Nevertheless, the results in FIG. 11 show speedups for the Phoenix Benchmarks running on the three SIMD configurations, normalized to a scalar-only run. The results in FIG. 10 (CAPE32k vs RISC-V baseline) and FIG. 11 (ARM+SVE vs ARM baseline) suggest that CAPE32k can achieve, on average, more than five times as much performance as the 512-bit SVE configuration (comparable to Intel's most aggressive SIMD implementation, AVX-512).

3. Roofline Study

Similar to the microbenchmarks section, the Phoenix applications are plotted using the Roofline model. By looking at FIG. 10 and FIG. 11, the speedups of constant-intensity applications (matmul, lreg, hist, kmeans) improve from CAPE32k to CAPE131k. However, the speedup of variable-intensity applications (wrdcnt, revidx, strmatch) worsens; an exception is pca, whose speedup remained unchanged for reasons discussed in the last section and is reflected in its fixed position on the Roofline plot.

Kmeans' change in intensity is explained by its algorithmic nature, previously discussed in the Results section. Unlike the other variable-intensity applications, its throughput on CAPE131k is much larger and closer to the compute-bound roofline, which leads to a dramatic increase in speedup: 426× with respect to an area comparable multicore system.

Although not visible for the CSB 22 capacities shown in the Phoenix applications Roofline plot (FIG. 9B), the throughput of constant-intensity applications shifts from compute-bound towards memory bound as the CSB 22 capacity increases. This indicates that these applications are able to effectively utilize the increased computational capabilities of CAPE 10, until they are limited by the main memory 14, which highlights the need for a high throughput main memory 14 like HBM.

In contrast, the throughput of variable-intensity applications remains far from the memory-bound roofline, suggesting that they take advantage of the increased computational capability to a much lesser degree. Like the microbenchmark idxsrch, these text-based applications must sequentially traverse through the matches of parallel searches and perform actions that are difficult to vectorize. As a result of Amdahl's law, any speedup from the vectorized regions is overshadowed by the cost of sequential regions, causing overall speedup to plateau. Coupled with increasing command distribution, the speedup in fact decreases as CAPE 10 scales up.

VII. Memory-Only Mode

Although CAPE 10 is focused on implementing a RISC-V vector ISA efficiently as an associate computing tile, in some embodiments the CSB 22 could alternatively be reconfigured as storage by the chip whenever it may be more advantageous. This section outlines three examples of using CAPE 10 as a memory-only tile. In general, some additional support is needed to accept external requests.

A. Scratchpad

A scratchpad is simply a block of physical memory which can be typically accessed directly using ordinary loads and stores (i.e., mapped into the virtual addressing space). In a multicore chip, a scratchpad may be useful, for example, to store private data or to exchange noncacheable data across cores. To support this mode, the VMU 24 is able to take in memory requests from remote nodes through the system interconnect and perform the appropriate physical address indexing.

B. Key-Value Storage

The scratchpad above can be further customized to operate as key-value storage, which is simply a repository of key-value pairs, where a value can be read from or written to by first finding its unique key (or, if it is not found, by first allocating a new key-value pair). Because the CSB 22 is content-addressable, it naturally supports this mode. Assuming, for example, that both key and value are 32-bit wide, and that each CSB 22 chain 38 is made up of 32 subarrays 30, then a chain 38 can store 16×32=512 key-value pairs (that's about half a million key-value pairs in the smaller CAPE 10 configuration of the evaluation, CAPE32k). Again, as in the case of the scratchpad, the VMU 24 should be able to take in key-value requests from the system and contain the appropriate indexing logic. To insert new key-value pairs, the VCU 26 may assist by running a microprogram that scans the CSB 22 looking for free entries, and/or the control processor 20 may execute a small program that maintains a free list.

C. Cache

The CSB 22 can leverage key-value storage functionality to work as a shared victim cache of the L2 caches, an additional slice of the LLC, etc. To do this, the control processor 20 and the VCU 26 are programmed to work closely with the controller of the cache it is augmenting (e.g., on a miss, an L2 cache controller sends a message to the CAPE 10 tile to check if the block is present in the victim cache CAPE 10 is emulating, concurrently to initiating an LLC access). In one possible implementation, each cache line (tag and data) is stored row-wise (since cache blocks can be fairly large); neither tag nor data are bit-sliced. Since the CSB 22 has 32 rows of subarrays 30, and each subarray 30 has 32 rows of bitcells, CAPE 10 as a cache can support up to ten index bits in the address (1,024 rows). An access to the CAPE 10 cache can be carried out with a few microinstructions that search for a tag match among a set of rows and, if a hit is found, command the VMU 24 to deliver the data block.

Those skilled in the art will recognize improvements and modifications to the preferred embodiments of the present disclosure. All such improvements and modifications are considered within the scope of the concepts disclosed herein and the claims that follow.

What is claimed is:

1. A content-addressable processing engine (CAPE) configured to execute a program having scalar operations and vector operations according to a CAPE instruction set architecture (ISA), the CAPE comprising:
a control processor configured to execute the scalar operations; and
a compute-storage block (CSB) which is a co-processor of the control processor and comprises an array of content-addressable parallel processing memories, wherein the CSB is configured to decode and carry out the vector instructions in situ via sequences of content-addressable memory operations without assistance from arithmetic logic units (ALUs);
wherein the vector instructions reference program data within the CSB according to a predetermined list of available vector register identifiers specified in the CAPE ISA.

2. The CAPE of claim 1, wherein the array of content-addressable parallel processing memories in the CSB comprises a plurality of subarrays, each subarray comprising rows of content-addressable memories.

3. The CAPE of claim 2, wherein each row in one of the plurality of subarrays corresponds to a different bit of a vector element.

4. The CAPE of claim 1, further comprising a vector memory unit (VMU) configured to interface with a memory external to the CAPE.

5. The CAPE of claim 4, wherein load and store instructions route to the CSB through the VMU.

6. The CAPE of claim 1, further comprising a vector control unit (VCU) configured to generate signal sequences for the CSB to execute the vector operations.

7. The CAPE of claim 6, wherein non memory-access instructions route to the CSB through the VCU.

8. An integrated circuit, comprising:
a content-addressable processing engine (CAPE) comprising an array of content-addressable parallel processing memories;
wherein:
the CAPE is configured to execute processing instructions comprising instructions for executing vector operations according to a CAPE instruction set architecture (ISA); and
the CAPE is configured to decode and carry out the instructions for executing vector operations in situ via sequences of content-addressable memory operations without assistance from arithmetic logic units (ALUs).

9. The integrated circuit of claim 8, wherein the CAPE is programmable using reduced instruction set computing (RISC) instructions.

10. The integrated circuit of claim 9, wherein the CAPE is programmable using RISC-V or later instructions.

11. The integrated circuit of claim 8, wherein:
the integrated circuit is a multi-core processor; and
the CAPE comprises a first core of the multi-core processor.

12. The integrated circuit of claim 11, wherein the multi-core processor is configured to cause the CAPE to operate in a memory-only mode providing on-chip memory for other cores of the multi-core processor.

13. The integrated circuit of claim 11, further comprising a central processing unit (CPU) core.

14. The integrated circuit of claim 11, further comprising a graphic processing unit (GPU) core.

15. The integrated circuit of claim 8, wherein the CAPE is configured to perform a first vector operation and a first scalar operation in parallel if there is no data dependency between the first vector operation and the first scalar operation.

16. A method for executing a program using parallel processing in a content-addressable processing engine (CAPE) according to a CAPE instruction set architecture (ISA), the method comprising:
receiving, at the CAPE, a set of processing instructions described by a general instruction set;
executing scalar operations from the set of processing instructions; and
decoding vector instructions from the set of processing instructions and executing corresponding vector operations in situ via content-addressable memory operations by an array of content-addressable parallel processing memories;
wherein the vector instructions reference program data according to a predetermined list of available vector register identifiers specified in the CAPE ISA.

17. The method of claim 15, further comprising:
generating signal sequences for operating the array of content-addressable parallel processing memories from the vector instructions described by the general instruction set; and
performing search and update operations using the signal sequences in a bit-parallel fashion across the array of content-addressable parallel processing memories.

* * * * *